United States Patent
Light et al.

(10) Patent No.: US 10,764,298 B1
(45) Date of Patent: Sep. 1, 2020

(54) SYSTEMS AND METHODS FOR IMPROVING A SECURITY PROFILE OF AN ENTITY BASED ON PEER SECURITY PROFILES

(71) Applicant: BitSight Technologies, Inc., Boston, MA (US)

(72) Inventors: Marc Noel Light, Somerville, MA (US); Liwei Lin, Herndon, VA (US); Thomas Erhardt Montroy, Cambridge, MA (US); Miguel Pinto, Dusseldorf (DE)

(73) Assignee: BitSight Technologies, Inc., Boston, MA (US)

( * ) Notice: Subject to any disclaimer, the term of this patent is extended or adjusted under 35 U.S.C. 154(b) by 0 days.

(21) Appl. No.: 16/802,232

(22) Filed: Feb. 26, 2020

(51) Int. Cl.
*H04L 29/06* (2006.01)
*H04L 12/24* (2006.01)

(52) U.S. Cl.
CPC ............ *H04L 63/102* (2013.01); *H04L 41/22* (2013.01); *H04L 63/1408* (2013.01); *H04L 63/1433* (2013.01); *H04L 63/20* (2013.01)

(58) Field of Classification Search
CPC ... H04L 63/102; H04L 63/20; H04L 63/1433; H04L 41/22; H04L 63/1408
See application file for complete search history.

(56) References Cited

U.S. PATENT DOCUMENTS

| | | |
|---|---|---|
| 7,062,572 B1 | 6/2006 | Hampton |
| D525,264 S | 7/2006 | Chotai |
| D525,629 S | 7/2006 | Chotai |
| D604,740 S | 11/2009 | Matheny |
| 7,650,570 B2 | 1/2010 | Torrens |
| 7,747,778 B1 | 6/2010 | King |
| 7,827,607 B2 | 11/2010 | Sobel et al. |
| D630,645 S | 1/2011 | Tokunaga |

(Continued)

FOREIGN PATENT DOCUMENTS

| | | |
|---|---|---|
| WO | WO-2017142694 A1 | 8/2017 |
| WO | WO-2019/023045 A1 | 1/2019 |

OTHER PUBLICATIONS

U.S. Appl. No. 15/271,655, Published as: US2018/0083999, Self-Published Security Risk Management, filed Sep. 21, 2016.

(Continued)

*Primary Examiner* — Michael Won
(74) *Attorney, Agent, or Firm* — Goodwin Procter LLP

(57) ABSTRACT

A computer-implemented method is provided for comparing the security profile of a particular entity to peer entities. The method can include receiving, for a particular entity, (i) a value for at least one feature and (ii) a number of security records of one or more security risk types. The method can include determining peer entities based on the value of the features; obtaining, for each peer entity, a number of security records; and adjusting the number of peer security records based on the number of entity security records. The method can further include comparing, for one or more security risk types, the received number of security records for the particular entity to the respective adjusted number of security records for each peer entity; and comparing a security profile of the particular entity to security profiles of the population of peer entities based on the comparison for the security risk types.

22 Claims, 9 Drawing Sheets

(56) References Cited

U.S. PATENT DOCUMENTS

| | | |
|---|---|---|
| D652,048 S | 1/2012 | Joseph |
| D667,022 S | 9/2012 | LoBosco |
| 8,370,933 B1 | 2/2013 | Buckler |
| D682,287 S | 5/2013 | Cong |
| D688,260 S | 8/2013 | Pearcy |
| D691,164 S | 10/2013 | Lim |
| D694,252 S | 11/2013 | Helm |
| D694,253 S | 11/2013 | Helm |
| 8,621,621 B1 | 12/2013 | Burns et al. |
| 8,661,146 B2 | 2/2014 | Alex et al. |
| D700,616 S | 3/2014 | Chao |
| 8,677,481 B1 | 3/2014 | Lee |
| 8,825,662 B1 | 9/2014 | Kingman et al. |
| D730,918 S | 6/2015 | Park |
| 9,053,210 B2 | 6/2015 | Elnikety |
| 9,075,990 B1 | 7/2015 | Yang |
| D740,847 S | 10/2015 | Yampolskiy et al. |
| D740,848 S | 10/2015 | Bolts |
| D741,351 S | 10/2015 | Kito |
| D746,832 S | 1/2016 | Pearcy |
| 9,241,252 B2 | 1/2016 | Dua et al. |
| 9,244,899 B1 | 1/2016 | Greenbaum |
| 9,294,498 B1 | 3/2016 | Yampolskiy et al. |
| D754,690 S | 4/2016 | Park |
| D754,696 S | 4/2016 | Follett |
| D756,371 S | 5/2016 | Bertnick |
| D756,372 S | 5/2016 | Bertnick |
| D756,392 S | 5/2016 | Yun |
| D759,084 S | 6/2016 | Yampolskiy et al. |
| D759,689 S | 6/2016 | Olson |
| 9,372,994 B1 | 6/2016 | Yampolskiy et al. |
| D760,782 S | 7/2016 | Kendler |
| 9,384,206 B1 | 7/2016 | Bono et al. |
| 9,401,926 B1 | 7/2016 | Dubow et al. |
| 9,407,658 B1 | 8/2016 | Kuskov et al. |
| 9,424,333 B1 | 8/2016 | Bisignani |
| D771,695 S | 11/2016 | Yampolskiy et al. |
| D772,276 S | 11/2016 | Yampolskiy et al. |
| 9,501,647 B2 | 11/2016 | Yampolskiy et al. |
| D773,507 S | 12/2016 | Sagrillo |
| D775,635 S | 1/2017 | Raji |
| D776,136 S | 1/2017 | Chen |
| D776,153 S | 1/2017 | Yampolskiy et al. |
| D777,177 S | 1/2017 | Chen |
| 9,560,072 B1 | 1/2017 | Xu |
| D778,927 S | 2/2017 | Bertnick |
| D778,928 S | 2/2017 | Bertnick |
| D779,512 S | 2/2017 | Kimura |
| D779,514 S | 2/2017 | Baris |
| D779,531 S | 2/2017 | List |
| D780,770 S | 3/2017 | Sum |
| D785,009 S | 4/2017 | Lim |
| D785,010 S | 4/2017 | Bachman |
| D785,016 S | 4/2017 | Berwick |
| 9,620,079 B2 | 4/2017 | Curtis |
| D787,530 S | 5/2017 | Huang |
| D788,128 S | 5/2017 | Wada |
| 9,641,547 B2 | 5/2017 | Yampolskiy et al. |
| 9,646,110 B2 | 5/2017 | Byrne |
| D789,947 S | 6/2017 | Sun |
| D789,957 S | 6/2017 | Wu |
| D791,153 S | 7/2017 | Rice |
| D791,834 S | 7/2017 | Eze |
| D792,427 S | 7/2017 | Weaver |
| D795,891 S | 8/2017 | Kohan |
| D796,523 S | 9/2017 | Bhandari |
| D801,989 S | 11/2017 | Iketsuki |
| D803,237 S | 11/2017 | Wu |
| D804,528 S | 12/2017 | Martin |
| D806,735 S | 1/2018 | Olsen |
| D806,737 S | 1/2018 | Chung |
| D809,523 S | 2/2018 | Lipka |
| D812,633 S | 3/2018 | Saneii |
| D814,483 S | 4/2018 | Gavaskar |
| D815,119 S | 4/2018 | Chalker |
| D815,148 S | 4/2018 | Martin |
| D816,105 S | 4/2018 | Rudick |
| D816,116 S | 4/2018 | Selassie |
| 9,954,893 B1 | 4/2018 | Zhao et al. |
| D817,970 S | 5/2018 | Chang |
| D817,977 S | 5/2018 | Kato |
| D819,687 S | 6/2018 | Yampolskiy et al. |
| 10,044,750 B2 | 8/2018 | Livshits et al. |
| 10,079,854 B1 | 9/2018 | Scott et al. |
| 10,142,364 B2 | 11/2018 | Baukes et al. |
| 10,185,924 B1 | 1/2019 | McClintock et al. |
| 10,217,071 B2 | 2/2019 | Mo et al. |
| 10,230,753 B2 | 3/2019 | Yampolskiy et al. |
| 10,230,764 B2 | 3/2019 | Ng et al. |
| 10,235,524 B2 | 3/2019 | Ford |
| 10,257,219 B1 | 4/2019 | Geil et al. |
| 10,305,854 B2 | 5/2019 | Alizadeh-Shabdiz et al. |
| 10,331,502 B1 | 6/2019 | Hart |
| 10,339,321 B2 | 7/2019 | Tedeschi |
| 10,339,484 B2 | 7/2019 | Pai et al. |
| 10,412,083 B2 | 9/2019 | Zou et al. |
| 10,469,515 B2 | 11/2019 | Helmsen et al. |
| 10,491,619 B2 | 11/2019 | Yampolskiy et al. |
| 10,491,620 B2 | 11/2019 | Yampolskiy et al. |
| 10,521,583 B1 | 12/2019 | Bagulho Monteiro Pereira |
| D880,512 S | 4/2020 | Greenwald et al. |
| 2002/0133365 A1 | 9/2002 | Grey et al. |
| 2002/0164983 A1 | 11/2002 | Raviv et al. |
| 2003/0187967 A1 | 10/2003 | Walsh et al. |
| 2004/0003284 A1 | 1/2004 | Campbell et al. |
| 2004/0098375 A1 | 5/2004 | DeCarlo |
| 2004/0193907 A1 | 9/2004 | Patanella |
| 2005/0066195 A1 | 3/2005 | Jones |
| 2005/0076245 A1 | 4/2005 | Graham et al. |
| 2005/0160002 A1 | 7/2005 | Roetter et al. |
| 2005/0278726 A1 | 12/2005 | Cano |
| 2006/0036335 A1 | 2/2006 | Banter |
| 2006/0107226 A1 | 5/2006 | Matthews |
| 2006/0253581 A1 | 11/2006 | Dixon et al. |
| 2007/0016948 A1 | 1/2007 | Dubrovsky et al. |
| 2007/0067845 A1 | 3/2007 | Wiemer et al. |
| 2007/0179955 A1* | 8/2007 | Croft .................. H04L 63/10 |
| 2007/0198275 A1 | 8/2007 | Malden et al. |
| 2007/0214151 A1* | 9/2007 | Thomas .............. H04L 63/14 |
| 2008/0033775 A1 | 2/2008 | Dawson et al. |
| 2008/0091834 A1 | 4/2008 | Norton |
| 2008/0140728 A1 | 6/2008 | Fraser et al. |
| 2008/0172382 A1 | 7/2008 | Prettejohn |
| 2008/0208995 A1 | 8/2008 | Takahashi et al. |
| 2008/0222287 A1 | 9/2008 | Bahl et al. |
| 2009/0125427 A1 | 5/2009 | Atwood et al. |
| 2009/0161629 A1 | 6/2009 | Purkayastha et al. |
| 2009/0216700 A1 | 8/2009 | Bouchard et al. |
| 2009/0299802 A1 | 12/2009 | Brennan |
| 2009/0300768 A1 | 12/2009 | Krishnamurthy et al. |
| 2009/0319420 A1 | 12/2009 | Sanchez et al. |
| 2009/0323632 A1 | 12/2009 | Nix |
| 2009/0328063 A1 | 12/2009 | Corvera et al. |
| 2010/0017880 A1 | 1/2010 | Masood |
| 2010/0042605 A1 | 2/2010 | Cheng et al. |
| 2010/0057582 A1 | 3/2010 | Arfin |
| 2010/0186088 A1 | 7/2010 | Banerjee et al. |
| 2010/0205042 A1 | 8/2010 | Mun |
| 2010/0218256 A1 | 8/2010 | Thomas et al. |
| 2010/0275263 A1 | 10/2010 | Bennett et al. |
| 2010/0281124 A1 | 11/2010 | Westman et al. |
| 2010/0281151 A1 | 11/2010 | Ramankutty et al. |
| 2011/0137704 A1 | 6/2011 | Mitra |
| 2011/0145576 A1 | 6/2011 | Bettan |
| 2011/0213742 A1 | 9/2011 | Lemmond et al. |
| 2011/0219455 A1 | 9/2011 | Bhagwan et al. |
| 2011/0231395 A1 | 9/2011 | Vadlamani |
| 2011/0239300 A1 | 9/2011 | Klein et al. |
| 2011/0296519 A1 | 12/2011 | Ide et al. |
| 2012/0036263 A1 | 2/2012 | Madden et al. |
| 2012/0089745 A1 | 4/2012 | Turakhia |
| 2012/0198558 A1 | 8/2012 | Liu et al. |
| 2012/0215892 A1 | 8/2012 | Wanser |
| 2012/0255027 A1 | 10/2012 | Kanakapura et al. |

(56) References Cited

U.S. PATENT DOCUMENTS

| | | |
|---|---|---|
| 2012/0291129 A1 | 11/2012 | Shulman et al. |
| 2013/0014253 A1 | 1/2013 | Vivian et al. |
| 2013/0060351 A1 | 3/2013 | Imming et al. |
| 2013/0080505 A1 | 3/2013 | Nielsen et al. |
| 2013/0086521 A1 | 4/2013 | Grossele |
| 2013/0091574 A1 | 4/2013 | Howes et al. |
| 2013/0124644 A1 | 5/2013 | Hunt et al. |
| 2013/0124653 A1 | 5/2013 | Vick et al. |
| 2013/0142050 A1 | 6/2013 | Luna |
| 2013/0173791 A1 | 7/2013 | Longo |
| 2013/0227078 A1 | 8/2013 | Wei et al. |
| 2013/0291105 A1 | 10/2013 | Zheng |
| 2013/0298244 A1 | 11/2013 | Kumar et al. |
| 2013/0305368 A1 | 11/2013 | Ford |
| 2013/0333038 A1 | 12/2013 | Chien |
| 2013/0347116 A1 | 12/2013 | Flores |
| 2014/0006129 A1 | 1/2014 | Heath |
| 2014/0019196 A1 | 1/2014 | Wiggins |
| 2014/0114755 A1 | 4/2014 | Mezzacca |
| 2014/0114843 A1 | 4/2014 | Klein et al. |
| 2014/0130158 A1 | 5/2014 | Wang et al. |
| 2014/0146370 A1 | 5/2014 | Banner et al. |
| 2014/0189098 A1 | 7/2014 | MaGill et al. |
| 2014/0244317 A1 | 8/2014 | Roberts et al. |
| 2014/0283068 A1 | 9/2014 | Call et al. |
| 2014/0288996 A1 | 9/2014 | Rence et al. |
| 2014/0304816 A1 | 10/2014 | Klein et al. |
| 2014/0337633 A1 | 11/2014 | Yang et al. |
| 2015/0033331 A1 | 1/2015 | Stern et al. |
| 2015/0033341 A1 | 1/2015 | Schmidtler et al. |
| 2015/0081860 A1 | 3/2015 | Kuehnel et al. |
| 2015/0156084 A1 | 6/2015 | Kaminsky et al. |
| 2015/0180883 A1 | 6/2015 | Aktas et al. |
| 2015/0261955 A1 | 9/2015 | Huang et al. |
| 2015/0264061 A1* | 9/2015 | Ibatullin .............. H04L 63/145 726/23 |
| 2015/0288706 A1 | 10/2015 | Marshall |
| 2015/0288709 A1 | 10/2015 | Singhal et al. |
| 2015/0310213 A1 | 10/2015 | Ronen et al. |
| 2015/0317672 A1 | 11/2015 | Espinoza et al. |
| 2015/0347756 A1 | 12/2015 | Hidayat et al. |
| 2015/0350229 A1 | 12/2015 | Mitchell |
| 2015/0381649 A1 | 12/2015 | Schultz et al. |
| 2016/0036849 A1 | 2/2016 | Zakian |
| 2016/0065613 A1 | 3/2016 | Cho et al. |
| 2016/0119373 A1 | 4/2016 | Fausto et al. |
| 2016/0140466 A1 | 5/2016 | Sidebottom |
| 2016/0147992 A1 | 5/2016 | Zhao et al. |
| 2016/0162602 A1 | 6/2016 | Bradish et al. |
| 2016/0171415 A1 | 6/2016 | Yampolskiy et al. |
| 2016/0173522 A1 | 6/2016 | Yampolskiy et al. |
| 2016/0182537 A1 | 6/2016 | Tatourian et al. |
| 2016/0189301 A1 | 6/2016 | Ng et al. |
| 2016/0191554 A1 | 6/2016 | Kaminsky |
| 2016/0205126 A1 | 7/2016 | Boyer et al. |
| 2016/0248797 A1 | 8/2016 | Yampolskiy et al. |
| 2016/0253500 A1 | 9/2016 | Alme et al. |
| 2016/0259945 A1 | 9/2016 | Yampolskiy et al. |
| 2016/0337387 A1 | 11/2016 | Hu et al. |
| 2016/0344801 A1 | 11/2016 | Akkarawittayapoom |
| 2016/0364496 A1 | 12/2016 | Li |
| 2016/0373485 A1* | 12/2016 | Kamble .............. H04L 63/1433 |
| 2017/0048267 A1 | 2/2017 | Yampolskiy et al. |
| 2017/0063901 A1 | 3/2017 | Muddu et al. |
| 2017/0161409 A1 | 6/2017 | Martin |
| 2017/0236078 A1 | 8/2017 | Rasumov |
| 2017/0237764 A1 | 8/2017 | Rasumov |
| 2017/0279843 A1 | 9/2017 | Schultz et al. |
| 2017/0300911 A1 | 10/2017 | Alnajem |
| 2017/0316324 A1 | 11/2017 | Barrett et al. |
| 2017/0318045 A1 | 11/2017 | Johns et al. |
| 2017/0324766 A1 | 11/2017 | Gonzalez |
| 2017/0337487 A1 | 11/2017 | Nock et al. |
| 2018/0013716 A1 | 1/2018 | Connell et al. |
| 2018/0103043 A1 | 4/2018 | Kupreev et al. |
| 2018/0123934 A1 | 5/2018 | Gissing et al. |
| 2018/0124110 A1 | 5/2018 | Hunt et al. |
| 2018/0139180 A1 | 5/2018 | Napchi et al. |
| 2018/0157468 A1 | 6/2018 | Stachura |
| 2018/0322584 A1 | 11/2018 | Crabtree et al. |
| 2018/0336348 A1 | 11/2018 | Ng et al. |
| 2018/0337938 A1 | 11/2018 | Kneib et al. |
| 2018/0337941 A1 | 11/2018 | Kraning et al. |
| 2018/0365519 A1 | 12/2018 | Pollard et al. |
| 2018/0375896 A1 | 12/2018 | Wang et al. |
| 2019/0034845 A1 | 1/2019 | Mo et al. |
| 2019/0089711 A1* | 3/2019 | Faulkner ................ H04L 67/22 |
| 2019/0098025 A1* | 3/2019 | Lim ...................... G06N 20/00 |
| 2019/0140925 A1 | 5/2019 | Pon et al. |
| 2019/0147378 A1 | 5/2019 | Mo et al. |
| 2019/0303574 A1 | 10/2019 | Lamay et al. |
| 2019/0379632 A1 | 12/2019 | Dahlberg et al. |
| 2019/0392252 A1 | 12/2019 | Fighel et al. |
| 2020/0053127 A1* | 2/2020 | Brotherton .......... H04L 63/1416 |
| 2020/0074084 A1* | 3/2020 | Dorrans .............. G06F 21/6245 |

OTHER PUBLICATIONS

U.S. Appl. No. 15/377,574, U.S. Pat. No. 9,705,932, Methods and Systems for Creating, De-Duplicating, and Accessing Data Using an Object Storage System, filed Dec. 13, 2016.

U.S. Appl. No. 14/021,585, U.S. Pat. No. 9,438,615, Published as: US2015/0074579, Security Risk Management, filed Sep. 9, 2013.

U.S. Appl. No. 15/216,955, Published as: US2016/0330231, Methods for Using Organizational Behavior for Risk Ratings, filed Jul. 22, 2016.

U.S. Appl. No. 15/239,063, Published as: US2017/0093901, Security Risk Management, filed Aug. 17, 2016.

U.S. Appl. No. 16/405,121, Published as: US2019/0260791, Methods for Using Organizational Behavior for Risk Ratings, filed May 7, 2019.

U.S. Appl. No. 13/240,572, Published as: US2016/0205126, Information Technology Security Assessment System, filed Sep. 22, 2011.

U.S. Appl. No. 14/944,484, U.S. Pat. No. 9,973,524, Published as: US2016/0323308, Information Technology Security Assessment System, filed Nov. 18, 2015.

U.S. Appl. No. 15/142,677, U.S. Pat. No. 9,830,569, Published as: US/2016/0239772, Security Assessment Using Service Provider Digital Asset Information, filed Apr. 29, 2016.

U.S. Appl. No. 15/134,845, U.S. Pat. No. 9,680,858, Annotation Platform for a Security Risk System, filed Apr. 21, 2016.

U.S. Appl. No. 15/044,952, Published as: US2017/0236077, Relationships Among Technology Assets and Services and the entities Responsible for them, filed Feb. 16, 2016.

U.S. Appl. No. 15/089,375, U.S. Pat. No. 10,176,445, Published as: US2017/0236079, Relationships Among Technology Assets and Services and the Entities Responsible for them, filed Apr. 1, 2016.

U.S. Appl. No. 29/598,298, U.S. Pat. No. D835,631, Computer Display Screen With Graphical User Interface, filed Mar. 24, 2017.

U.S. Appl. No. 29/598,299, U.S. Pat. No. D818,475, Computer Display With Security Ratings Graphical User Interface, filed Mar. 24, 2017.

U.S. Appl. No. 29/599,622, Computer Display With Security Ratings Graphical User Interface, filed Apr. 5, 2017.

U.S. Appl. No. 29/599,620, Computer Display With Security Ratings Graphical User Interface, filed Apr. 5, 2017.

U.S. Appl. No. 16/015,686, Methods for Mapping IP Addresses and Domains to Organizations Using User Activity Data, filed Jun. 22, 2018.

U.S. Appl. No. 16/543,075, Methods for Mapping IP Addresses and Domains to Organizations Using User Activity Data, filed Aug. 16, 2019.

U.S. Appl. No. 16/738,825, Methods for Mapping IP Addresses and Domains to Organizations Using User Activity Data, filed Jan. 9, 2020.

U.S. Appl. No. 15/918,286, Correlated Risk in Cybersecurity, filed Mar. 12, 2018.

(56) References Cited

OTHER PUBLICATIONS

U.S. Appl. No. 16/292,956, Correlated Risk in Cybersecurity, filed May 5, 2019.
U.S. Appl. No. 16/170,680 Systems and Methods for Remote Detection of Software Through Browser Webinjects, filed Oct. 25, 2018.
U.S. Appl. No. 16/688,647, Systems and Methods for Remote Detection of Software through Browser Webinjects, filed Nov. 19, 2019.
U.S. Appl. No. 15/954,921, Systems and Methods for External Detection of Misconfigured Systems, filed Apr. 17, 2018.
U.S. Appl. No. 16/549,764, Systems and Methods for Inferring Entity Relationships Via Network Communications of Users or User Devices, filed Aug. 23, 2019.
U.S. Appl. No. 29/666,942, Computer Display with Graphical User Interface, filed Oct. 17, 2018.
U.S. Appl. No. 15/271,655, the Office Actions dated Feb. 21, 2017 and Aug. 18, 2017.
U.S. Appl. No. 15/377,574, now U.S. Pat. No. 9,705,932, the Office Action dated Mar. 2, 2017 and the Notice of Allowance dated Jun. 1, 2017.
U.S. Appl. No. 14/021,585, now U.S. Pat. No. 9,438,615, the Office Action dated Mar. 11, 2016 and the Notice of Allowance dated Aug. 9, 2016.
U.S. Appl. No. 15/216,955, now U.S. Pat. No. 10,326,786, the Office Actions dated Nov. 4, 2016, Mar. 9, 2017, Jun. 6, 2017, Dec. 5, 2017, and Aug. 29, 2018, and the Notice of Allowance dated Feb. 6, 2019.
U.S. Appl. No. 15/239,063, now U.S. Pat. No. 10,341,370, the Office Action dated Mar. 21, 2018 and the Notice of Allowance dated Jan. 14, 2019.
U.S. Appl. No. 16/405,121, the Office Action dated Aug. 1, 2019 and Nov. 21, 2019.
U.S. Appl. No. 13/240,572, the Office Actions dated Nov. 21, 2013, Jun. 16, 2014, Feb. 27, 2015, Jun. 3, 2015, Oct. 26, 2015, Mar. 10, 2016 Feb. 13, 2017.
U.S. Appl. No. 14/944,484, now U.S. Pat. No. 9,973,524, the Office Actions dated Mar. 11, 2016, Nov. 5, 2016, and Jan. 17, 2017 and the Notice of Allowance dated Oct. 20, 2017.
U.S. Appl. No. 15/142,677, now U.S. Pat. No. 9,830,569, the Office Actions dated Jul. 26, 2016, and Apr. 24, 2017 and the Notice of Allowance dated Oct. 11, 2017.
U.S. Appl. No. 15/134,845, now U.S. Pat. No. 9,680,858, the Office Actions dated Jul. 19, 2016 and Jan. 26, 2017, and the Notices of Allowance dated Apr. 27, 2017 and May 9, 2017.
U.S. Appl. No. 15/044,952, the Office Actions dated Jul. 8, 2019 and Feb. 21, 2020.
U.S. Appl. No. 15/089,375, now U.S. Pat. No. 10,176,445, the Office Actions dated Sep. 9, 2016, May 17, 2017, and Nov. 17, 2017 and the Notice of Allowance dated Aug. 9, 2018.
U.S. Appl. No. 29/598,298, now U.S. Pat. No. D835,631, the Notice of Allowance dated Aug. 15, 2018.
U.S. Appl. No. 29/598,299, now U.S. Pat. No. D818,475, the Notice of Allowance dated Jan. 2, 2018.
U.S. Appl. No. 29/599,622, now U.S. Pat. No. D847,169, the Notice of Allowance dated Dec. 11, 2018.
U.S. Appl. No. 29/599,620, now U.S. Pat. No. D846,562, the Office Action dated May 3, 2018, the Notice of Allowance dated Nov. 27, 2018.
U.S. Appl. No. 16/015,686, now U.S. Pat. No. 10,425,380, the Office Action dated Nov. 16, 2018 and the Notice of Allowance dated May 10, 2019.
U.S. Appl. No. 16/543,075, the Notice of Allowance dated Sep. 25, 2019.
U.S. Appl. No. 16/738,825, the Office Action dated Jul. 8, 2019 and Feb. 21, 2020.
U.S. Appl. No. 15/918,286, now U.S. Pat. No. 10,257,219, the Office Action dated Aug. 7, 2018 and the Notice of Allowance dated Nov. 29, 2018.
U.S. Appl. No. 16/292,956, the Office Action dated Jul. 10, 2019 and the Notices of Allowance dated Jan. 8, 2020 and Jan. 27, 2020.
U.S. Appl. No. 16/795,056, the Office Action dated May 1, 2020.
U.S. Appl. No. 16/170,680, the Office Action dated Mar. 26, 2019; the Notices of Allowance dated Oct. 29, 2019 and Aug. 27, 2019.
U.S. Appl. No. 16/688,647, the Office Action dated Jan. 29, 2020; the Notice of Allowance dated May 12, 2020.
U.S. Appl. No. 15/954,921, the Office Actions dated Sep. 4, 2018, Jan. 3, 2019, Aug. 19, 2019, and Dec. 5, 2019; Advisory Action dated Mar. 3, 2020.
U.S. Appl. No. 16/787,650, the Notice of Allowance dated Apr. 7, 2020.
U.S. Appl. No. 16/583,991, the Office Action dated Jan. 13, 2020.
U.S. Appl. No. 29/666,942, the Notice of Allowance dated Apr. 30, 2020.
U.S. Appl. No. 16/360,641, the Office Action dated Aug. 7, 2019 and Feb. 20, 2020.
U.S. Appl. No. 16/514,771, the Office Action dated Dec. 4, 2019; the Notice of Allowance dated Mar. 18, 2020.
U.S. Appl. No. 16/775,840, the Notice of Allowance dated May 19, 2020.
BitSight, "Cyber Security Myths Versus Reality: How Optimism Bias Contributes to Inaccurate Perceptions of Risk", Jun. 2015, Dimensional Research, pp. 1-9.
U.S. Appl. No. 13/240,572 as of Oct. 7, 2015, application as filed and pending claims, 45 pages.
U.S. Appl. No. 13/240,572 and pending claims as of Mar. 22, 2016, 10 pages.
Provos et al., "The Ghost in the Browser Analysis of Web-based Malware", 2007 (9 pages).
Li et al., "Finding the Linchpins of the Dark Web: a Study on Topologically Dedicated Hosts on Malicious Web Infrastructures", IEEE, 2013 (15 pages).
Bhilare et al., "Protecting Intellectual Property and Sensitive Information in Academic Campuses from Trusted Insiders: Leveraging Active Directory", SIGUCC, Oct. 2009 (5 pages).
Jin et al, "Identifying and tracking suspicious activities through IP gray space analysis", MineNet, Jun. 12, 2007 (6 pages).
Chuvakin, "SIEM: Moving beyond compliance", RSA White Paper (2010) (16 pages).
Pending claims for U.S. Appl. No. 14/021,585, as of Apr. 29, 2016, 2 pages.
Application as filed and pending claims for U.S. Appl. No. 13/240,572 as of Apr. 29, 2016, 46 pages.
Application as filed and pending claims for U.S. Appl. No. 14/944,484 as of Apr. 29, 2016, 4 pages.
Pending claims for U.S. Appl. No. 14/021,585, as of Nov. 18, 2015, 6 pages.
Application as filed, pending claims of U.S. Appl. No. 13/240,572 as of Nov. 18, 2015, 45 pages.
Hachem, Sara; Toninelli, Alessandra; Pathak, Animesh; Issany, Valerie. Policy-Based Access Control in Mobile Social Ecosystems. 2011 IEEE International Symposium on Policies for Distributed Systems and Networks (POLICY). Http://ieeexplore.ieee.org/stamp/stamp.jsp?arnumber=5976796. 8 pages.
Srivastava, Divesh; Velegrakis, Yannis. Using Queries to Associate Metadata with Data. IEEE 23rd International Conference on Data Engineering. Pub. Date: 2007. http://ieeexplore.ieee.org/stamp/stamp.jsp?arnumber=4221823, 3 pages.
Gephi (gephi.org), accessed on the internet at https://web.archive.org/web/20151216223216/https://gephi.org/; Dec. 16, 2015; 1 page.
mile 2 CPTE Maltego Demo, accessed on the internet at https://www.youtube/com/watch?v=o2oNKOUzPOU; Jul. 12, 2012; 1 page.
"Neo4j (neo4j.com)," accessed on the internet at https://web.archive.org/web/20151220150341 /http://neo4j.com:80/developer/guide-data-visualization/; Dec. 20, 2015; 1 page.
"Creating Transparency with Palantir," accessed on the internet at https://www.youtube.com/watch?v=8cbGChfagUA; Jul. 5, 2012; 1 page.
"Palantir Cyber: Uncovering malicious behavior at petabyte scale," accessed on the internet at https://www.youtube.com/watch?v=EhYezV06EE; Dec. 21, 2012; 1 page.

(56) References Cited

OTHER PUBLICATIONS

Borgatti, et al., "On Social Network Analysis in a Supply Chain Context," Journal of Supply Chain Management; 45(2): 5-22; Apr. 2009, 18 pages.

Carstens, et al., "Modeling Company Risk and Importance in Supply Graphs," European Semantic Web Conference 2017: The Semantic Web pp. 18-31.

Gundert, Levi, "Big Data in Security—Part III: Graph Analytics," accessed on the Internet at https://blogs.cisco.com/security/big-data-in-security-part-iii-graph-analytics; Cisco Blog, Dec. 2013, 8 pages.

Jean, "Cyber Security: How to use graphs to do an attack analysis," accessed on the internet at https://linkurio.us/blog/cyber-security-use-graphs-attack-analysis/; Aug. 2014, 11 pages.

"Palantir.com," accessed on the internet at http://www.palantir.com/; Dec. 2015; 2 pages.

KC Claffy, "Internet measurement and data analysis: topology, workload, performance and routing statistics," accessed on the Internet at http://www.caida.org/publications/papers/1999/Nae/Nae.html., NAE '99 workshop, 1999, 22 pages.

"Maltego XL," accessed on the Internet at https://www.paterva.com/web7/buy/maltegoclients/maltego-xl.php, 5 pages.

Massimo Candela, "Real-time BGP Visualisation with BGPlay," accessed on the Internet at https://labs.ripe.net/Members/massimo_candela/real-time-bgp-visualisationwith-bgplay), Sep. 30, 2015, 8 pages.

Noel, et al., "Big-Data Architecture for Cyber Attack Graphs, Representing Security Relationships in NoSQL Graph Databases," The MITRE Corporation, 2014, 6 pages.

Wagner, et al., "Assessing the vulnerability of supply chains using graph theory," Int. J. Production Economics 126 (2010) 121-129.

Moradi, et al., "Quantitative Models for Supply Chain Management," IGI Global, 2012, 29 pages.

Joslyn, et al., "Massive Scale Cyber Traffic Analysis: A Driver for Graph Database Research," Proceedings of the First International Workshop on Graph Data Management Experience and Systems (GRADES 2013), 6 pages.

"About Neo4j," 1 page.

"Amazon Mechanical Turk," accessed on the internet at https://www.mturk.com/; 7 pages.

"Rapid7 Nexpose Vulnerability Scanner," accessed on the internet at https://www.rapid7.com/products/nexpose/download/, 3 pages.

"Tenable Nessus Network Vulnerability Scanner," accessed on the internet at https://www.tenable.com/products/nessus/nessus-professional; 13 pages.

"Computer Network Graph," http://www.opte.org; 1 page.

McNab, "Network Security Assessment," copyright 2004, 56 pages.

Gilgur, et al., "Percentile-Based Approach to Forecasting Workload Growth" Proceedings of CMG'15 Performance and Capacity International Conference by the Computer Measurement Group. No. 2015 (Year:2015).

Seneviratne et al., "SSIDs in the Wild: Extracting Semantic Information from WiFi SSIDs" HAL archives-ouvertes.fr, HAL Id: hal-01181254, Jul. 29, 2015, 5 pages.

Search Query Report form IP.com (performed Apr. 27, 2020).

\* cited by examiner

FIG. 2D

SYSTEMS AND METHODS FOR IMPROVING A SECURITY PROFILE OF AN ENTITY BASED ON PEER SECURITY PROFILES

TECHNICAL FIELD

The following disclosure is directed to methods and systems for determining peer entities of a particular entity based on the entity features and comparing a security profile of the particular entity to security profiles of the peer entities to improve the particular entity's security profile.

BACKGROUND

As awareness of cybersecurity risk increases, entities (e.g., organizations, companies, etc.) look to understand their exposure to security threats and, in some cases, seek guidance on the types of protective measures that can be taken to minimize their exposure. Some entities seek to understand how they compare with peer entities in terms of threat exposure and the measures that their peer entities are undertaking to protect themselves. However, due to the substantial variation in entity features, operating procedures, historical records, and security resources among entities, it is difficult to directly or efficiently compare one entity to another entity in the context of cybersecurity risk.

SUMMARY

Disclosed herein are exemplary systems and methods for comparing a particular entity to peer entities so as to enable the particular entity to improve its security profile. For example, the entity may improve its security profile by reducing its exposure to security threats and/or determining the measures the particular entity can take that would have greater impact on its security profile. The exemplary methods and systems described herein efficiently provide this information to stakeholders associated with the particular entity. Note that an entity can include an organization, a company, a group, a school, a government, etc.

In one aspect, the disclosure features a computer-implemented method including receiving, for a particular entity, (i) a value for one or more features of the entity and (ii) a number of security records for the entity, in which each security record being of a security risk type. The method can further include determining a population of peer entities based on the value of the features; obtaining, for each peer entity, a number of security records; and adjusting the number of peer security records based on the number of entity security records. The method can further include comparing, for one or more security risk types, the received number of security records for the particular entity to the respective adjusted number of security records for each peer entity; comparing a security profile of the particular entity to security profiles of the population of peer entities based on the comparison for the security risk types; and presenting the comparison of the security profiles in a user interface.

Various embodiments of the exemplary method can include one or more of the following features. The method can include determining an impact of each security risk type on an entity security profile; and presenting one or more security risk types based on the determined impact. Presenting the security risk types based on the determined impact can include determining a rank of each security risk type for improving the entity security profile; and presenting a ranking of two or more security risk types based on the determined rank of each security risk type. Determining an impact of each security risk type on an entity security profile can include determining a temporal decay for the security risk type; and adjusting the impact of the security risk type based on the temporal decay.

Determining the population of peer entities based on the value of one or more features can include determining the population of peer entities based on a value of a weighted combination of two or more features. The feature(s) can include an industry of an entity; a security rating of an entity; a software platform utilized by an entity; a geographical location of an entity; or a size of an entity. The industry of an entity can include an industry name and/or a sector name. The geographical location of an entity can be based on a physical location and/or an Internet Protocol (IP) address. The software platform utilized by an entity can be for a server system of the entity, a user base of the entity, and/or a website of the entity. The size of an entity can be based on a number of employees of the entity and/or a number of services provided by the entity. The population of peer entities can include at least 100 peer entities.

In another aspect, the disclosure features a system including one or more computer systems programmed to perform operations. The operations can include receiving, for a particular entity, (i) a value for one or more features of the entity and (ii) a number of security records for the entity, in which each security record being of a security risk type. The operations can further include determining a population of peer entities based on the value of the features; obtaining, for each peer entity, a number of security records; and adjusting the number of peer security records based on the number of entity security records. The operations can further include comparing, for one or more security risk types, the received number of security records for the particular entity to the respective adjusted number of security records for each peer entity; comparing a security profile of the particular entity to security profiles of the population of peer entities based on the comparison for the security risk types; and presenting the comparison of the security profiles in a user interface.

Various embodiments of the exemplary system can include one or more of the following features. The operations can include determining an impact of each security risk type on an entity security profile; and presenting one or more security risk types based on the determined impact. Presenting the security risk types based on the determined impact can include determining a rank of each security risk type for improving the entity security profile; and presenting a ranking of two or more security risk types based on the determined rank of each security risk type. Determining an impact of each security risk type on an entity security profile can include determining a temporal decay for the security risk type; and adjusting the impact of the security risk type based on the temporal decay.

Determining the population of peer entities based on the value of one or more features can include determining the population of peer entities based on a value of a weighted combination of two or more features. The feature(s) can include an industry of an entity; a security rating of an entity; a software platform utilized by an entity; a geographical location of an entity; or a size of an entity. The industry of an entity can include an industry name and/or a sector name. The geographical location of an entity can be based on a physical location and/or an Internet Protocol (IP) address. The software platform utilized by an entity can be for a server system of the entity, a user base of the entity, and/or a website of the entity. The size of an entity can be based on a number of employees of the entity and/or a number of services provided by the entity. The population of peer entities can include at least 100 peer entities.

BRIEF DESCRIPTION OF THE DRAWINGS

FIGS. 2C-2D are graphical representations of exemplary user interfaces that include detailed peer group information for particular security risk types.

DETAILED DESCRIPTION

Figure 1:
FIG. 1 is graphical representation of an exemplary user interface that can include options for the user to select or enter one or more features for a particular entity.

Disclosed herein are exemplary embodiments of systems and methods for comparing a particular entity to peer entities. The exemplary methods may include one or more of the following sub-methods, as described in further detail below:

I. Exemplary methods for determining one or more peer entities of a particular entity based on one or more features of the particular entity; and/or II. Exemplary methods for adjusting the number of records of peer entities based on the number of records of the particular entity.

Further disclosed herein are exemplary embodiments of systems and methods for improving a security profile of the particular entity based on the comparison to peer entities. The exemplary methods may include one or more of the following sub-methods, as described in further detail below:

III. Exemplary methods for generating improvement plans for a particular entity based on the comparison to peer entities;

IV. Exemplary methods for prioritizing one or more security risk types for improving the security profile of the entity; and/or V. Exemplary methods for forecasting a security profile of the particular entity based on the security profiles of peer entities.

Entity Features

In some embodiments, the exemplary methods and systems can include determining one or more peer entities of a particular entity based on one or more features of the particular entity ("Entity A"). The exemplary methods can include receiving or obtaining values for one or more features of the entity.

The features of an entity can include an industry; a sub-industry; a North American Industry Classification System (NAICS) code; a Standard Industrial Classification (SIC) code; an industry sector; an entity size; an employee count; a number of services provided by the entity; a security rating (e.g., as provided by BitSight Technologies, Inc. of Boston, Mass., USA); a geographical location of the entity; a location of the entity based on one or more IP addresses associated with the entity (e.g., "geo IP" footprint); a number of Internet Protocol (IP) addresses associated with the entity; the technology used by the entity (e.g., server software, user software, etc.); one or more security risk types of an entity (e.g., refer to the exemplary security risk types under heading "Security Risk Types and Security Records"); and/or known competitors or entities similar to the particular entity based on the web activity of the entity.

Values for one or more of the above-listed entity features may be provided by the entity itself, obtained from third party sources (e.g., a firmographics data source, data from BuiltWith® Pty Ltd), and/or collected or extracted from publicly available information. In some embodiments, the values for one or more entity features can be stored in a database.

Peer Groups

The received value for the feature(s) of the particular entity can be used to determine the peer entities for the particular entity. These peer entities may be referred to herein as a "population of peer entities" or a "peer group". In some embodiments, to determine the group of peer entities, the system can access a database of entities and corresponding values for various features. The exemplary system can then search the database based on the received value to determine entities that are peers to the particular entity.

In some embodiments, the system can populate a peer entity group with entities that are within a particular range (e.g., within 50%, within 25%, within 10%, etc.) of the feature value of the particular entity. In some embodiments, a threshold can be utilized to ensure that a large enough number of peer entities are included the peer group. For instance, if the particular range for a feature value does not yield a minimum number (e.g., at least 50, at least 100, at least 150, etc.) of entities for the peer group, then a minimum number (e.g., at least 50, at least 100, at least 150, etc.) of entities having feature values similar to that of the particular entity are selected for the peer group.

For the feature of entity size, the received value (e.g., the employee count) of the particular entity can be compared to the corresponding values (e.g., the employee count) of the entities. Therefore, for example, for a particular range of within 50% (also represented as ±50%), if Entity A has 400 employees, entities having between 200 to 600 employees are included in the peer entity group of Entity A. If the particular range does not yield a minimum number of 100 entities, then 100 entities having an employee count closest to Entity A are selected for the peer entity group.

In some embodiments, the peer group can be determined such that the peer entities are selected for values of two or more entities features. If, in such a case, the resulting number of peer entities is below a minimum number (e.g., at least 50, at least 100, at least 150, etc.) of entities for the peer group), then the range of values for one or more features may be relaxed to ensure that the peer group includes at least a minimum number of peers. For example, if the peer group is to be determined based on (1) employee count and (2) geographical location and this determination leads to a peer group of less than the minimum number of peer entities, then the range of employee count of the particular entity and/or the physical radius around the particular entity can be increased to attain the minimum number of peer entities.

In some embodiments, the system can include a user interface to enable a user to enter a value for one or more features of the particular entity to determine peer entities for the peer group. Exemplary user interfaces may include drop-down boxes to select from a list, radio buttons to select a single value or value range, check boxes to select one or more values, text fields to enter values, a sliding bar to select a value or value range, etc. FIG. 1 illustrates an exemplary user interface 100 that can include options for the user to select or enter one or more entity features, as described above. For example, a feature option 102 can be used to select an industry of the entity; a feature option 104 can be used select a sub-industry of the entity; a feature option 106 can be used select a range for employee count (e.g., "Similar to Company" or any number of employees); and/or a feature option 108 can be used to select a number of services offered by the entity (e.g., "Similar to Company" or any number of services).

In some embodiments, to determine peer entities for a peer group, a distance measure can be determined between the particular entity and a set of candidate entities (e.g., entities in a database) based on one or more respective values of entity features. For example, a distance measure may be determined for each entity feature between the particular entity and each of the set of entities. In some embodiments, the distance measures can be normalized, e.g., by converting the distance measure to a Z-score (which indicates the number of standard deviations away from a mean value).

In some embodiments, for each candidate entity, the normalized distance measures between the particular entity and the candidate entity can be combined. In some embodiments, the normalized distance measures can be combined in a weighted sum. The weights may be predetermined or provided by a user via a user interface. Of the determined sums of the candidate entities, a subset of candidate entities can be determined for the peer group by selecting sums under a threshold, thereby collecting those entities closest to the particular. The threshold can be predetermined or determined dynamically (e.g., based on a standard deviation). For example, of 300 candidate entities' sums, the 100 smallest candidate entities' sums can be used to select the corresponding 100 peer entities for the peer group.

As discussed above, in some embodiments, this technique of identifying peer entities can be customizable by the user. For example, a user seeking to determine a peer group may be more interested in the software that is commonly used within the peer group. In this way, a user may ultimately be able to determine whether a security risk common to the peer group is due to a particular software used by all the peer entities (as discussed further herein below). In another example, a user may wish to determine how to improve the security profile (including, e.g., the security rating) of the particular entity. Therefore, it may be beneficial to determine peer entities to evaluate comparable security profiles.

In some embodiments, a peer entity group for a particular entity can change over time. This can be true when the features of the entity and/or the features of its peers change over time. Therefore, the comparison between a particular entity and peer entities may change over time. In some embodiments, the method can include determining peer entities for the particular entity periodically or intermittently so as to 'update' the peer entity group.

Security Risk Types and Security Records

In some embodiments, determining security profiles of entities uses externally observable information as proxies for (i) the effectiveness of the overall security performance of the policies and controls that entity implements and exercises and/or (ii) the vulnerability of the entity to security risk. This externally observable information can be categorized into observable subject areas, risk types, or "risk vectors", which can each be independently determined and/or characterized. For example, one possible proxy for entity vulnerability is the number of entity-owned IP addresses which are reported by third parties to be malicious. The greater the number of reports, the more likely the particular entity was vulnerable and had been compromised.

The security profile may include the security practices and/or security record(s) of an entity. The security records can be of a particular security risk type (also referred to herein as a "risk vector"). In various embodiments, the security risk types can include:

i. an amount of capital investment in security of the entity;
 ii. a measure of employee training in security of the entity;
 iii. a measure of organization of a team dedicated to information security;
 iv. an amount of budget dedicated to information security;
 v. a number and/or severity of botnet infection instances of a computer system associated with the entity (referred to herein as "Botnet Infections");
 vi. a number of spam propagation instances originating from a computer network associated with the entity (referred to herein as "Spam Propagation");
 vii. a number of malware servers associated with the entity (referred to herein as "Malware Servers");
 viii. a number of potentially exploited devices associated with the entity (referred to herein as "Potentially Exploited");
 ix. a number of hosts authorized to send emails on behalf of each domain associated with the entity;
 x. a determination of whether a DomainKeys Identified Mail (DKIM) record exists for each domain associated with the entity and/or a key length of a public key associated with a Domain Name System (DNS) record of each domain associated with the entity (referred to herein as "DKIM");
 xi. an evaluation of a Secure Sockets Layer (SSL) certificate and/or a Transport Layer Security (TLS) certificate associated with a computer system of the entity (referred to herein as "SSL Certificates");
 xii. a number and/or type of service of open ports of a computer network associated with the entity (referred to herein as "Open Ports");
 xiii. an evaluation of security-related fields of an header section of HTTP response messages of hosts associated with the entity (referred to herein as "Web Application Headers");
 xiv. a rate at which vulnerabilities are patched in a computer network associated with the entity;
 xv. an evaluation of file sharing traffic originating from a computer network associated with the entity (referred to herein as "File Sharing");
 xvi. a number of lost records and/or sensitivity of information in the lost records in a data breach of a computer system associated with the entity;

xvii. a signal and/or an indication that a host has attempted to contact a service on another host without solicitation (e.g., attempt is unexpected or the service is unsupported) (referred to herein as "Unsolicited Communication"), which may occur in some cases due to malware scanning for open network access points on other computers over the Internet;

xviii. a signal and/or an indication that TLS/SSL configuration of an entity's server is proper, which can indicate that the security protocol libraries of a server associated with an entity are correctly configured and/or support strong encryption standards when making connections to other computer systems (referred to herein as "SSL Configuration");

xix. a signal and/or an indication that entity's server system has software that is not supported by software vendors and/or is out-of-date (referred to herein as "Server Software");

xx. a presence of Sender Policy Framework (SPF) record(s) in the entity's domain (including subdomains) (e.g., of an entity's mail server system) that have sent or attempted to send an email (referred to herein as "SPF");

xxi. data indicating the operating system version and/or web browser version of one or more computer systems of the entity (referred to herein as "Desktop Software");

xxii. a number of endpoints (e.g., computer, server, mobile device, media system, and/or appliance having Internet access) of an entity's computer system in communication with an unintended destination (e.g., a web domain that does not exist or not registered) (referred to herein as "Insecure Systems"); and/or xxiii. data indicating the operating system version, device description, web browser version, description of applications of one or more mobile devices in the entity's computer network (referred to herein as "Mobile Software").

In some embodiments, the exemplary methods can include receiving security records of the particular entity and/or receiving the number of security records for the particular entity. For example, the number of security records can be the number over a time window (e.g., the past five years, past three years, past year, past quarter, past month, etc.) for the particular entity. Note that a security record may be associated with a timestamp for which the record was made. The number of the entity's security records can be used for a 'like-for-like' comparison between the security profile of the particular entity and that of its peer entities. For example, a particular entity may have a relatively short history of monitoring its security profile and therefore may have relatively few security records. In another example, a particular entity may be a smaller or larger organization than its peers and therefore its security record count may be proportionally fewer or greater. Therefore, to make a more direct comparison of security profiles between the particular entity and its peers, the security records of the peer entities can be adjusted accordingly. Table 1 below illustrates a simple example of an adjustment of a peer entity's records based on the particular entity's records.

TABLE 1

Exemplary adjustment of the number of peer security records.

|  | # of security records for Entity A | # of security records for Peer Entity 1 | # of adjusted security records for Peer Entity 1 |
|---|---|---|---|
| Total records | 10 | 100 | 10 |
| Negative records | 2 | 20 | 2 |

Note that 'negative records' indicate security records of a risk type for which the value is negative. An example of a negative security record is a record that Entity A experienced a botnet infection at a particular time. Conversely, if there was a security evaluation of Entity A and no botnet infections were uncovered, then a positive security record may be logged. Note also that if the adjusted record number for a peer entity results in a count less than one (1), then the record number may be automatically set to one (1).

In some embodiments, the exemplary methods can include receiving IP addresses of the particular entity and/or receiving the number of IP addresses for the particular entity. For example, the number of IP addresses can be can be the number over a time window (e.g., the past five years, past three years, past year, past quarter, past month, etc.) for the computer system of the particular entity. The number of the entity's IP addresses can be used for a 'like-for-like' comparison between the security profile of the particular entity and that of its peer entities.

In some embodiments, the exemplary methods can include adjusting the number of security records and/or their impact on an entity's profile based on the age associated with the particular security record. For example, a negative security record in the distant history (e.g., five years ago) for entity may be deemphasized or not as equally weighted as a more recent security record (e.g., within the last six months). In some embodiments, the age of a security record of a peer entity may be adjusted as follows:

$$A_{temporal} = \left(1 + \sum_i \left(\frac{t_{present} - t_{record\_i}}{t_{interval}} * N_{record}\right)\right) / \left(\sum_i (N_{record})\right)$$

where $A_{temporal}$ is the temporal adjustment, $t_{present}$ is the present date, $t_{record\_i}$ is the timestamp of the security record, $t_{interval}$ is the time over the interval of interest (e.g., a month, a quarter, a year, etc.), and $N_{record}$ is the number of records in the interval of interest.

In some embodiments, adjusting the number of security records and/or their impact on an entity's profile can be based on (i) the age associated with the particular security record and (ii) an entity feature (see examples of entity features described above). For example, the security record count of a peer entity for both age and employee count may be adjusted as follows:

$$N_{adjusted\_peer} = N_{record\_peer} * \frac{\sqrt{N_{employee\_peer}}}{\sqrt{N_{employee\_entity}}} * \frac{A_{temporal\_peer}}{A_{temporal\_entity}}$$

where $N_{adjusted\_peer}$ is the adjusted peer record count, $N_{employee\_peer}$ is the peer employee count, $N_{employee\_entity}$ is the employee count for the particular entity, $A_{temporal\_peer}$ is the temporal adjustment for the peer security records (e.g., as determined by the equation for $A_{temporal}$ above), and $A_{temporal\_entity}$ is the temporal adjustment for the security records of the particular entity (e.g., as determined by the equation for $A_{temporal}$ above).

Security Profile

A security profile of an entity may reflect the past, present, and/or future security characteristics of an entity. In some embodiments, the security profile may reflect security risks to which the entity is exposed balanced by the countermeasures that the entity has taken or can take to mitigate the security risk. As referred to herein, a security profile of an entity can include a security rating for the entity. A security rating may be quantitative or qualitative. For example, a quantitative security rating may be expressed as a number within a predetermined range (e.g., between 300 and 900, as provided by BitSight Technologies, Inc. of Boston, Mass., USA).

Examples of determining security ratings of entities based on the security risk types can be found in at least U.S. Publication No. 2016/0205126 published on Jul. 14, 2016 and titled "Information Technology Security Assessment System," U.S. Pat. No. 9,973,524 issued on May 15, 2018 and titled "Information Technology Security Assessment System," U.S. Pat. No. 9,830,569 issued on Nov. 28, 2017 and titled "Security Assessment Using Service Provider Digital Asset Information," and U.S. patent application Ser. No. 16/514,771 filed on Jul. 17, 2019 and titled "Systems and methods for generating security improvement plans for entities", all of which are incorporated herein by reference in their entireties.

In some embodiments, received data for an entity can include two or more security risk types (e.g., of those listed above). In some cases, determining the security rating for an entity can include determining the relationship between the first security risk type and the second security risk type. This relationship can be stored in a database and accessed for use. For example, the number of botnet infections of an entity may be correlated with the number of potentially exploited devices associated with the entity. This correlation can be stored and referenced in the future. In some embodiments, the security profile of an entity is associated with, related to, or equal to the security rating of that entity (e.g., on a scale from 300 to 900, as provided by BitSight Technologies, Inc., Boston, Mass., USA).

In some embodiments, to compute the security ratings for an entity, obtained data pertaining to the IT assets owned by that entity may be aggregated. For example, IT assets can include the IP addresses controlled by the entity and obtained data can include the activity associated with those IP addresses. To determine externally observable information about IP address-based assets, one or more IP addresses can be associated with an entity. The data may be processed to determine additional information. For example, processing may yield a list of IP addresses for an entity that has demonstrated suspicious or malicious behavior or fails to follow best security practices for the given reference data point. Similar methods can be used for other types of assets, e.g., domain-based assets, or other information for which an asset can be determined to be associated to an organization. Using these techniques, information about that asset can be associated with the entity.

The exemplary security ratings systems and methods may be configured to account for differences in data sources and types. Given each data source's potentially unique insight of an entity, there can be two or more techniques used to take advantage of the respective data. Data source-specific modeling techniques may be applied to some or all of the data sources to demonstrate feasibility and validate the approach for each data source and modeling technique.

In some embodiments, the combination of two or more vectors may produce a security rating that reflects the effectiveness of an entity's security efforts. The determination of individual vectors and the overall security rating can be influenced by security best-practices as promoted by standardized and accepted cybersecurity frameworks. In some embodiments, evidence of security compromise can be used to understand the specific impact the individual vectors have on the security rating of the entity. For instance, correlation between sources of externally observed information can be used to determine the impact of vectors. For example, the vectors representing evidence of compromised workstations (owned or controlled by an entity) may represent a significant portion of the entity's ability to implement security controls correctly, and thus may influence the entity's security rating more than other types of information.

An improved security rating reflects improvements made to the security profile of the entity. Specifically, the security profile of an entity may be based on records of one or more security risk types, as described above. These input parameters are typically modifiable in that an entity can change or improve the value of the parameter, thereby improving its security rating. For example, an entity can strive to decrease the number of botnet infections or decrease the number of malware-infected servers. By doing so, an entity's security rating may increase, e.g., from 680 to 720, indicating an improved ability to withstand or prevent cybersecurity attacks. An improved security rating can also increase confidence of various stakeholders of the entity that the entity is more secure and/or protected from cybersecurity risks that it had previously been. Examples of improving security ratings of an entity can be found in U.S. patent application Ser. No. 16/514,771 titled "Systems and Methods for Generating Security Improvement Plans for Entities" and filed on Jul. 17, 2019, which is incorporated herein by reference in its entirety.

In some embodiments, improving an entity's security profile can include determining which security risk types (refer to discussion under heading "Security Risk Types and Security Records" above) the entity should focus on mitigating. Various security risk types may have different impacts on the security profile of an entity. For example, security records of a first risk type may have a greater impact on the entity's security profile than a record of a second risk type. Therefore, the exemplary method may include determining the impact of the security risk type on the entity's security profile. In some embodiments, the impact that a security record has may depend on the security risk type, the amount of time passed since the security record, and/or the temporal decay associated with the security risk type.

In some embodiments, the comparison between a particular entity's security ratings and peer entities' security ratings can be used in forecasting security ratings for the particular entity. Forecasting security ratings for entities by taking into account future security events can aid entities in realistically managing their cybersecurity vulnerabilities. Additionally, forecasts of security ratings can help third parties, such as insurance providers or business partners, in evaluating an organization's exposure to and ability to address cyber threats into the future. In some embodiments, using comparable data of peer entities' security profiles enables more accurate forecasts of security ratings and, in some instances, specific forecasts of the security risk types that the entity may encounter based on its peers' historical record.

In some embodiments, in forecasting security ratings for a particular entity for a time period, the possible range of future security ratings that the particular entity can have can be based on the historical security ratings of the peer entities. For instance, the future security ratings of the particular entity can be bound by an upper limit and/or a lower limit based on peer entities' historical security ratings. In some embodiments, these upper and lower limits may be symmetrical. For example, future security ratings can be within a range determined by a lower limit of $5^{th}$ percentile, $10^{th}$ percentile, $20^{th}$ percentile, etc. and an upper limit of $95^{th}$ percentile, $90^{th}$ percentile, $80^{th}$ percentile, etc., respectively. In some embodiments, the upper and lower limits may be asymmetrical. For example, the upper limit may be $10^{th}$ percentile while the lower limit may be $20^{th}$ percentile. In some embodiments, the upper and lower limits may be expressed as a standard deviation from a mean or median of peer entities' security ratings. In some embodiments, the future time period (e.g., a month, quarter, half year, year, etc.) of the particular entity for which the security ratings are being forecasted can correspond to the historical time period (e.g., a month, quarter, half year, year, etc.) of the peer entities. For example, a historical time period of the past four months of peer entities' security ratings can be used to determine a future four month time period of security ratings for the particular entity.

In some embodiments, to more accurately forecast security ratings for a particular entity, the constituent peer entities of a peer group may be adjusted. For example, if a particular entity has a security rating of 600 at a particular time to and wants to attain a security rating of 750 in a year or more, peer entities having a security rating of 600 a year ago ($t_0$-$t_{365}$) are selected for comparison. In this way, a more realistic comparison between the particular entity and the peer entities can be made. Further, such a peer group can provide a more realistic future projection for the particular entity's security rating. In the above example, peer entities that were able to improve their security rating from 600 to 750 over a time period of a year can be useful in determining how to improve the particular entity's security rating, e.g., by determining which security risk types to mitigate or resolve.

In another example, a particular entity ("Entity A") with a letter grade F (depending on the particular entity compares to its peer group percentile) can compare its security profile to peer entities in its peer group. An example peer entity ("Peer Entity 1") having a letter grade B may be twice the size of Entity A (e.g., in terms of employee count or service count) and/or may have had different security records (e.g., at different times, of different security risk types, and/or of a different number) over a past time period. The security records of Peer Entity 1 can be adjusted using the techniques described herein to more accurately inform Entity A how best to set future goals (e.g., by managing their own security records) for achieving a better letter grade in their peer group. Examples of forecasting security ratings for entities can be found in U.S. patent application Ser. No. 16/360,641 titled "Systems and Methods for Forecasting Cybersecurity Ratings based on Event-Rate Scenarios" and filed on Mar. 21, 2019, which is incorporated herein by reference in its entirety.

Exemplary User Interfaces

Figure 2A:
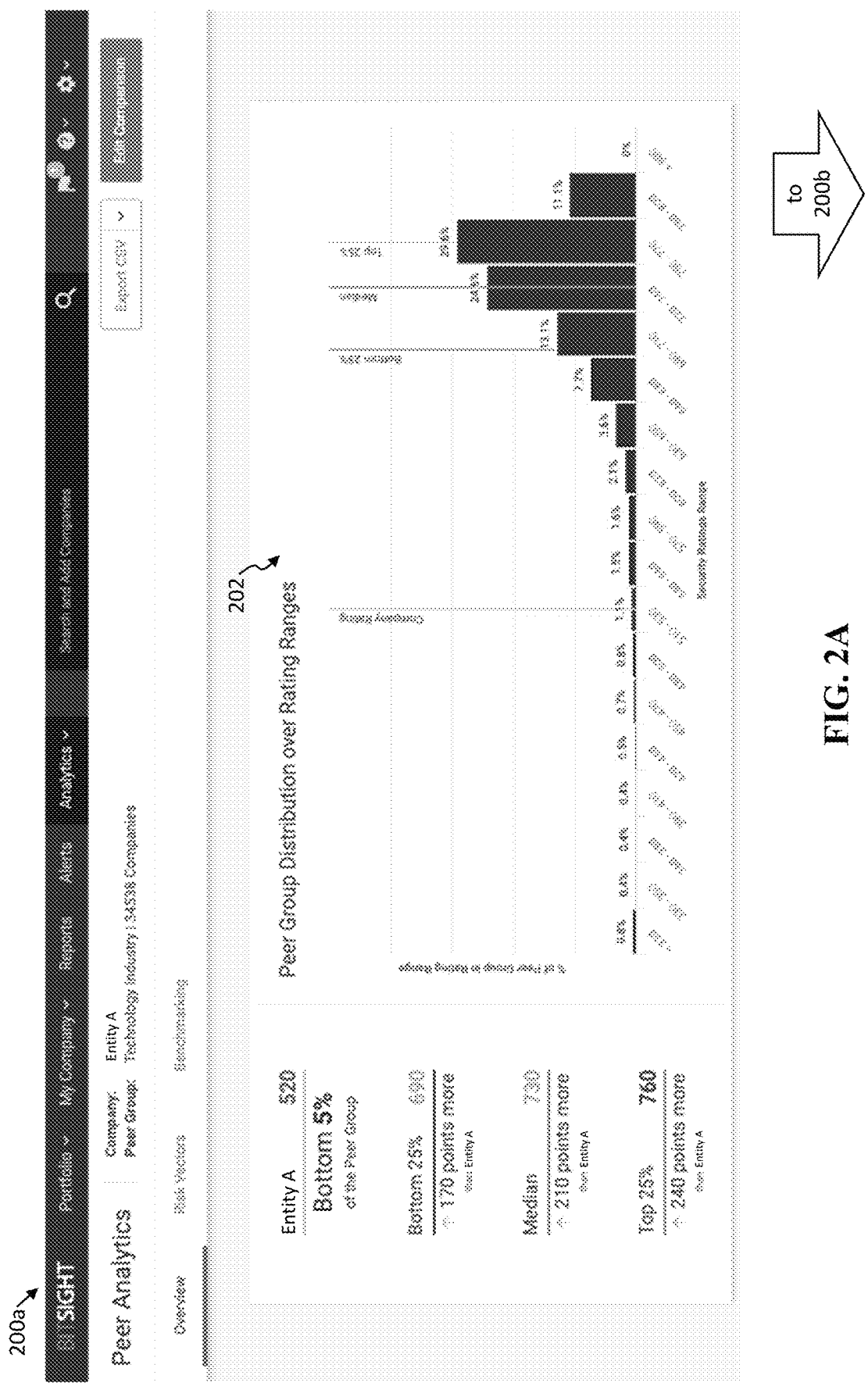
FIG. 2A is a graphical representation of an exemplary user interface for presenting comparisons between the security profile of the particular entity and the security profiles of peer entities.

FIG. 2A illustrates an exemplary user interface 200a that includes a comparison between a particular entity's security ratings and the peer entities' security ratings. For example, the user interface 200a can include a plot 202 (e.g., a bar chart, a histogram, a line graph, a dot graph, etc.) of the percentage of the peer group as a function of security ratings (e.g., in a rating range). Peer entities may be determined using the exemplary methods described herein and bucketed into security rating ranges for comparison to the particular entity. In this example, Entity A has a security rating of 520, which is comparably less than its peers, the bottom 25% of which averages at a security rating of 690, the median of which averages at a security rating of 730, and the top 25% of which averages at a security rating of 760.

Figure 2B:
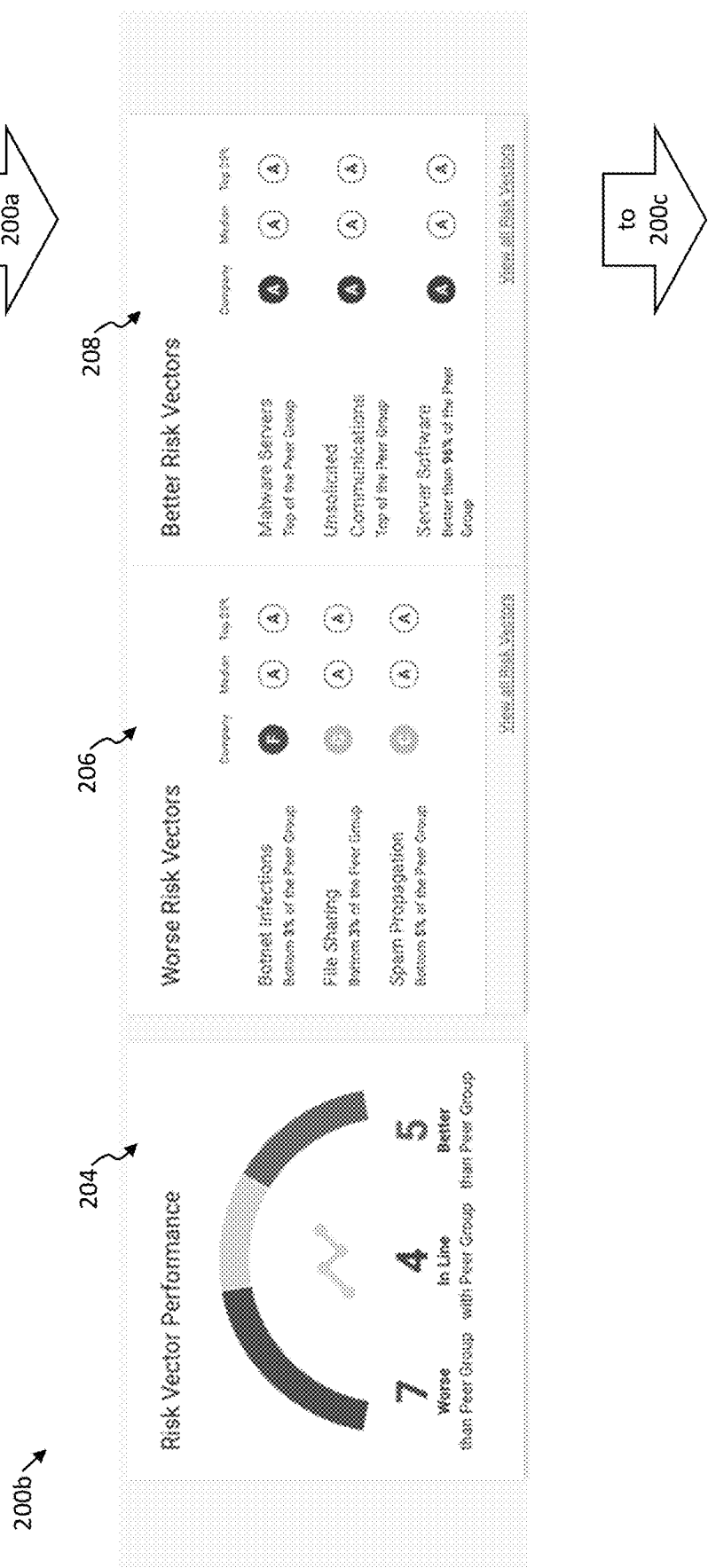
FIG. 2B is a graphical representation of an exemplary user interface for presenting comparisons between the security risk types for the particular entity and the respective security risk types for peer entities.

FIG. 2B illustrates an exemplary user interface 200b that includes a graphical comparison between a particular entity's security risk types (also referred to as "risk vectors") and the peer entities' security risk types. The interface 200b can include a graph (e.g., a half circle chart, a circle chart, a pie chart, a line chart, a dot chart, etc.) illustrating how the entity compares to its peers with respect to one or more security risk types. In this example, Entity A is worse than its peers for seven security risk types, in line with its peers for four security risk types, and better than its peers for 5 security risk types. Some or all of these risk types can be presented in portions 206 and/or 208 of interface 200b. For example, the 'worse' risk types include Botnet Infections, File Sharing, and Spam Propagation, as illustrated in portion 206. The 'better' risk types include Malware Servers, Unsolicited Communications, and Server Software, as illustrated in portion 208.

Figure 2C:
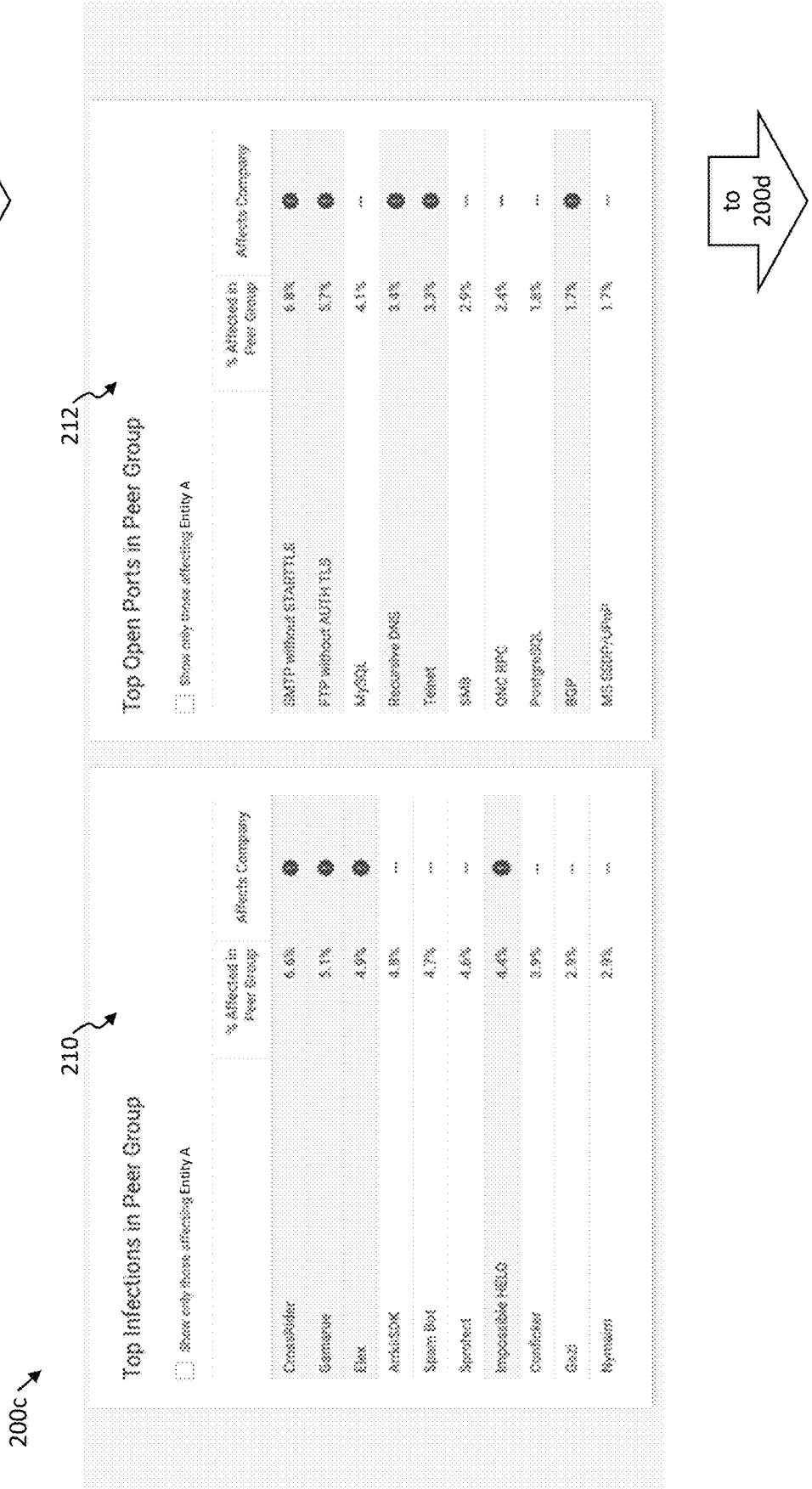
Figure 2D:
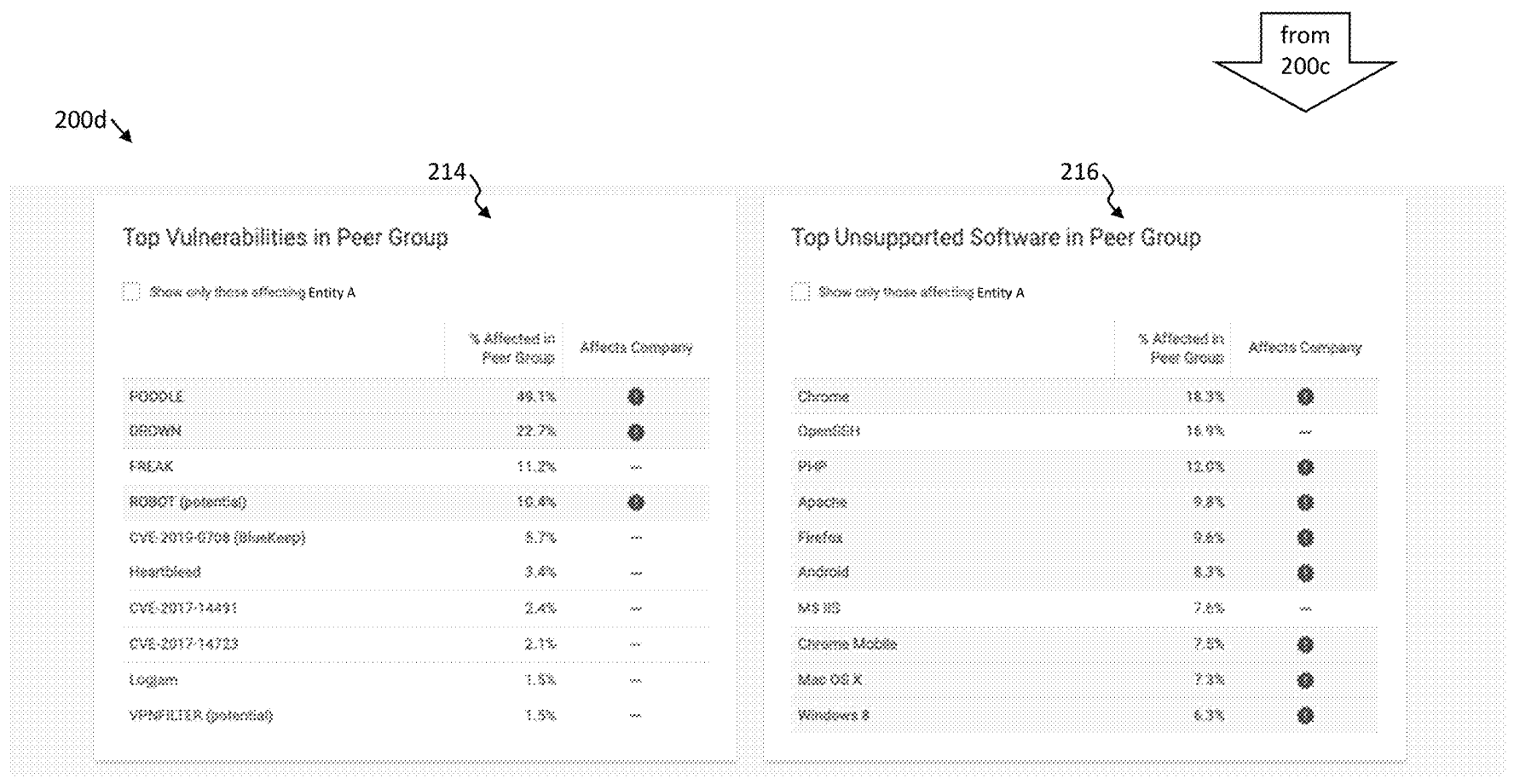

FIGS. 2C-2D illustrate exemplary user interfaces 200c and 200d that include one or more portions for detailed peer group information for particular security risk types. For example, portion 210 includes Botnet Infection types for the peer group and indicates whether the given type affects the particular entity (referred to as "Company" or "Entity A"). In another example, portion 212 includes Open Port types for the peer group. In another example, portion 214 includes Vulnerability types for the peer group. In another example, portion 216 includes Unsupported Software types for the peer group. In some embodiments, user interfaces 200a, 200b, 200c, and/or 200d can be included in a single user interface. For example, interface 200a can be arranged on top of (and adjacent to) interface 200b in a single interface. In another example, interface 200a can be arranged on top of (and adjacent to) interface 200b, which can be arranged on top of (and adjacent to) interface 200c, which can be arranged on top of (and adjacent to) 200d.

Figure 3:
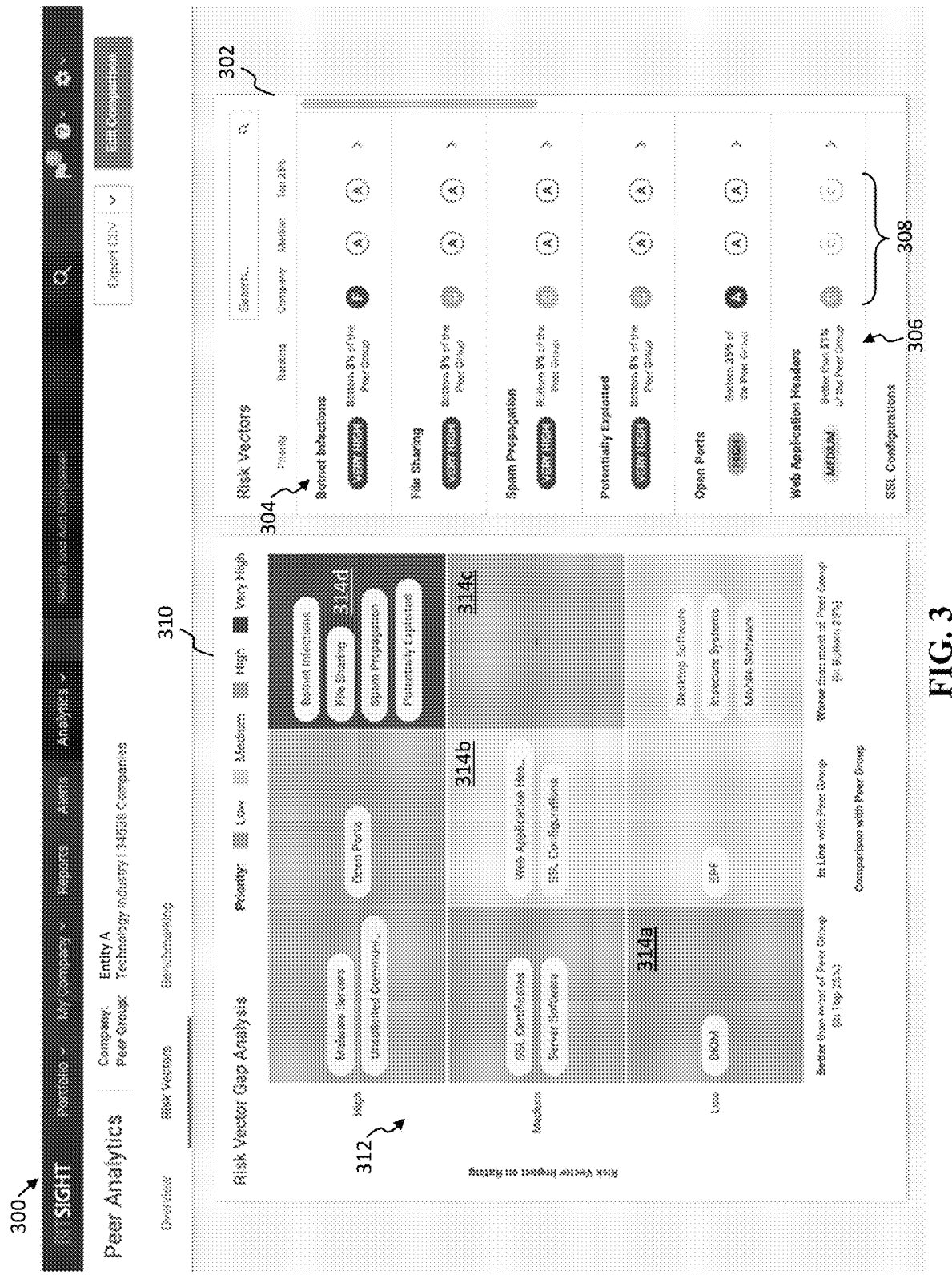
FIG. 3 is a graphical representation of an exemplary user interface for presenting information related to the impact of a security risk type on a security profile of a particular entity.

FIG. 3 illustrates an exemplary user interface 300 for presenting information related to the impact of a security risk type on a security profile (e.g., security rating) of a particular entity (in this example, "Entity A"). For example, the user interface 300 can include a portion 302 listing one or more security risk types (also referred to as "risk vectors") which impact the security profile of the entity. For example, in column 304, security risk types including "Botnet infections", "File Sharing", "Spam Propagation", "Potentially Exploited", "Open Ports", "Web Applications", and/or "SSL Configurations" can be listed. The exemplary portion 302 may also include information related to how the particular Entity A compares to its peer group (as discussed above). For example, in column 306, the comparison between a particular and its peer group may be quantified as a percentile (e.g., "Bottom 3% of the Peer Group"; "Better than 51% of the Peer Group"; etc.). In column 308, the comparison may be qualitatively presented as a letter grade (e.g., grades A through F). For example, grade A may be indicated for high degree of mitigation of the security risk type while grade F may be indicated for poor mitigation. Exemplary column 308 can include a letter grade for the entity (labelled "Company"), a letter grade for the median of the peer group, and/or a letter grade for the top 25% of the peer group with respect to the particular security risk type.

Because security risk types can have differing impacts on an entity's security profile, in some embodiments, security risk types may be ranked according to their impact on an entity's security profile. The security risk types may be ranked numerically or in categories. Referring to portion 302, the exemplary security risk types may be ranked "Low", "Medium", or "High". Exemplary column 304 can include a rank indicator and/or a priority indicator for the particular security risk type. For example, Botnet Infections may be considered to have a high impact on an entity's security profile and therefore may be listed higher on the list or marked as such. The priority indicator (e.g., "Low", "Medium", "High", or "Very High") in column 304 can indicate how high the entity should prioritize the mitigation of the particular security risk type to improve its security profile.

In some embodiments, a user interface may include a graphical representation of the impact that risk types have on an entity's security profile. For example, interface 300 includes a portion 310 that presents risk types as a function of (i) the comparison of the entity to its peer group, (ii) ranking according to its impact on an entity's security profile, and/or (iii) a priority indicator to indicate how high the entity should prioritize the mitigation of the particular security risk type to improve its security profile. In this example, these functions are presented as a matrix 312. The matrix 312 can include spaces or slots for presenting the various risk types. Various techniques can be used to present the ranking and/or prioritization of the security risk types, including colors, placement, sounds, patterns, animations, etc. In this example, the matrix 312 can be shaded or colored to indicate the priority from "Low" (e.g., matrix block 314a), "Medium" (e.g., matrix block 314b), "High" (e.g., matrix block 314c), to "Very High" (e.g., matrix block 314d). The various security risk types may be arranged in the matrix 312 in the bottom row ("Low" rank of impact), middle row ("Medium" rank of impact), or top row ("High" rank of impact). The various security risk types may be arranged in the matrix 312 in the left column ("Better than most of Peer Group (in Top 25%)"), middle column ("In Line with Peer Group), or right column ("Worse than most of Peer Group (in Bottom 25%)").

Exemplary Methods

Figure 4:
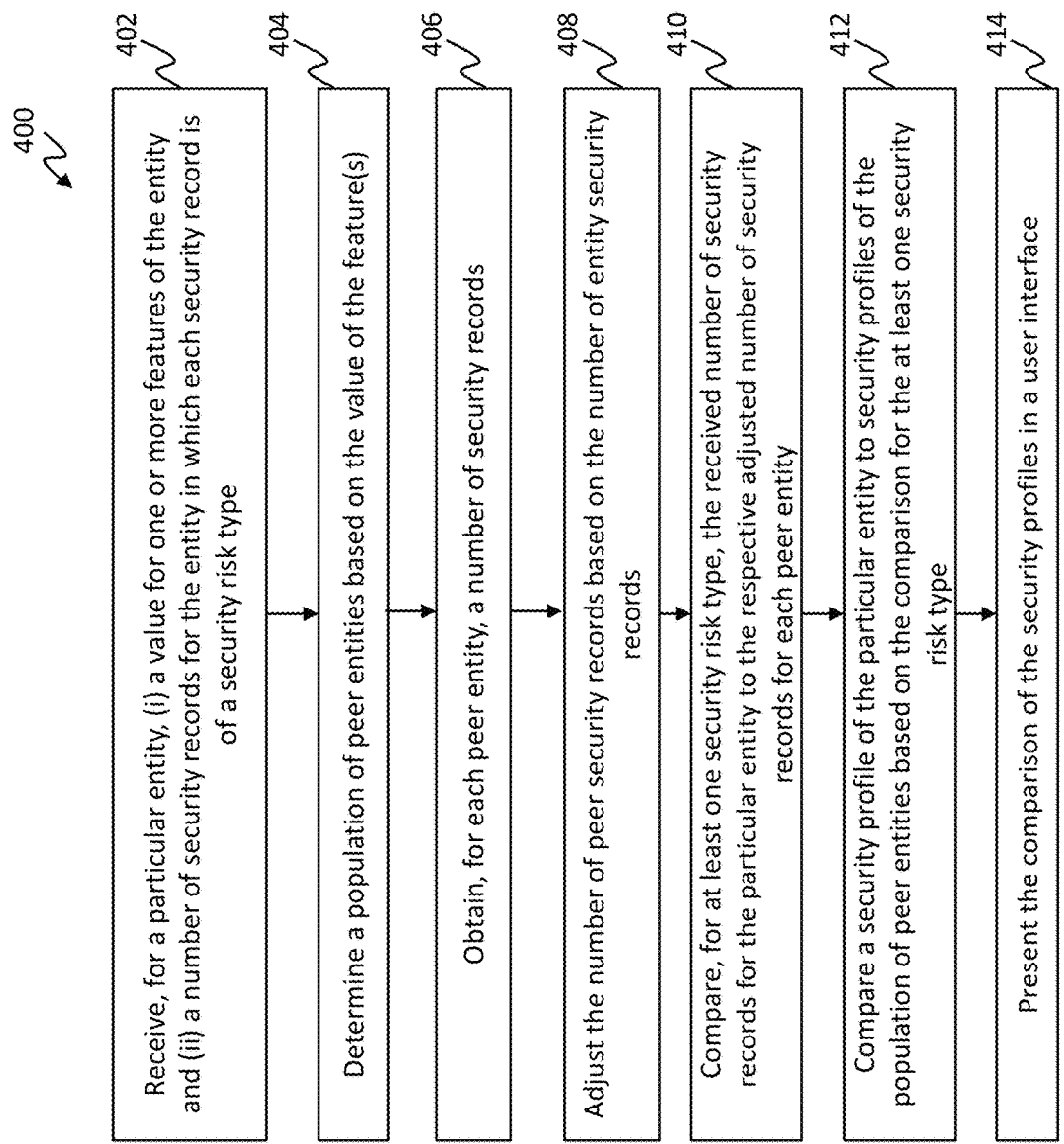
FIG. 4 is a flowchart of an exemplary method for comparing a security profile of a particular entity to the security profiles of peer entities.

FIG. 4 is a flowchart illustrating an exemplary method 400 for comparing a security profile of an entity to the security profiles of peer entities. In step 402, the method includes receiving, for a particular entity, (i) a value for one or more features of the entity and (ii) a number of security records for the entity. The security record can be of a security risk type, as described above. Additionally or alternatively, the method may include receiving a number of IP addresses for the particular entity.

In step 404, the method can include determining a population of peer entities (e.g., a peer group) based on the respective values of the entity features, as described above under heading "Peer Groups".

In step 406, the method can include obtaining, for each peer entity, a number of security records. Additionally or alternatively, the method may include obtaining, for each peer entity, a number of IP addresses.

In step 408, the method can include adjusting the number of peer security records based on the number of security records of the particular entity. Additionally or alternatively, the method may include adjusting the number of peer security records based on the temporal decay (see discussion above). Additionally or alternatively, the method may include adjusting the number of peer IP addresses based on the number of entity IP addresses.

Figure 5A:
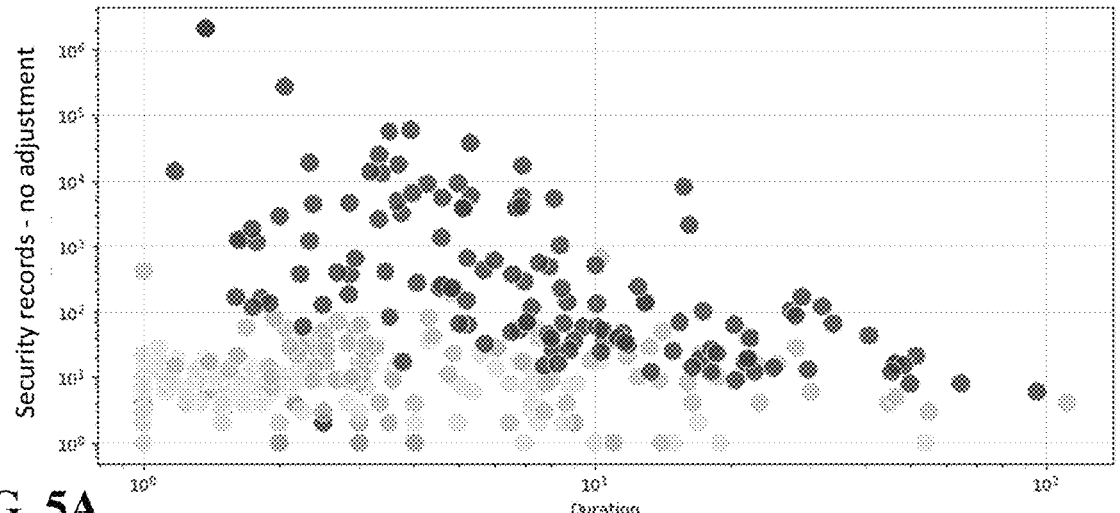
FIGS. 5A-5C are plots illustrating exemplary adjustments of the security record counts of a security risk type for a peer entity group.
Figure 5B:
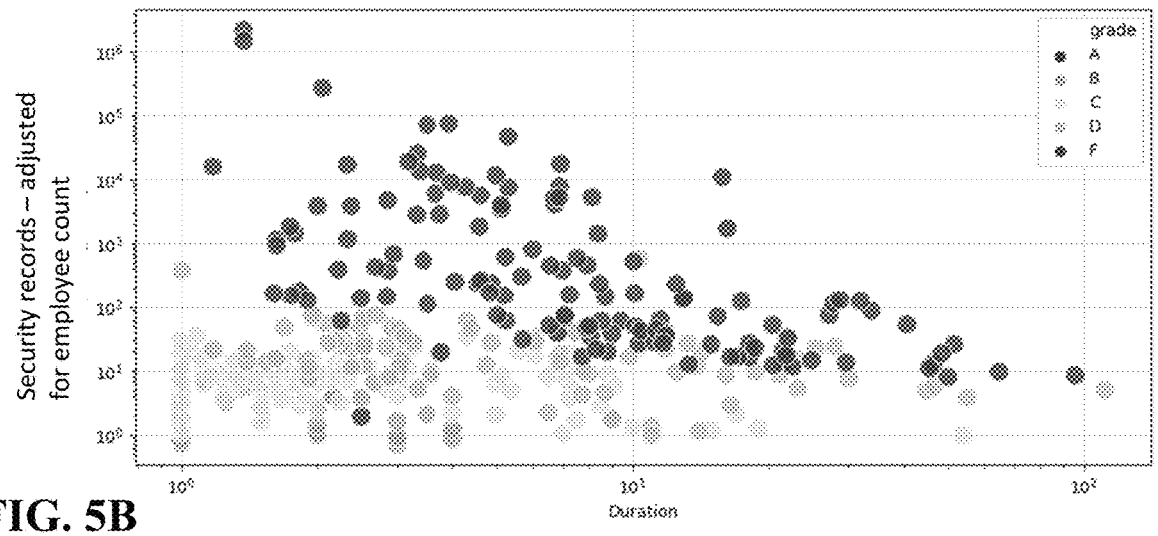
Figure 5C:
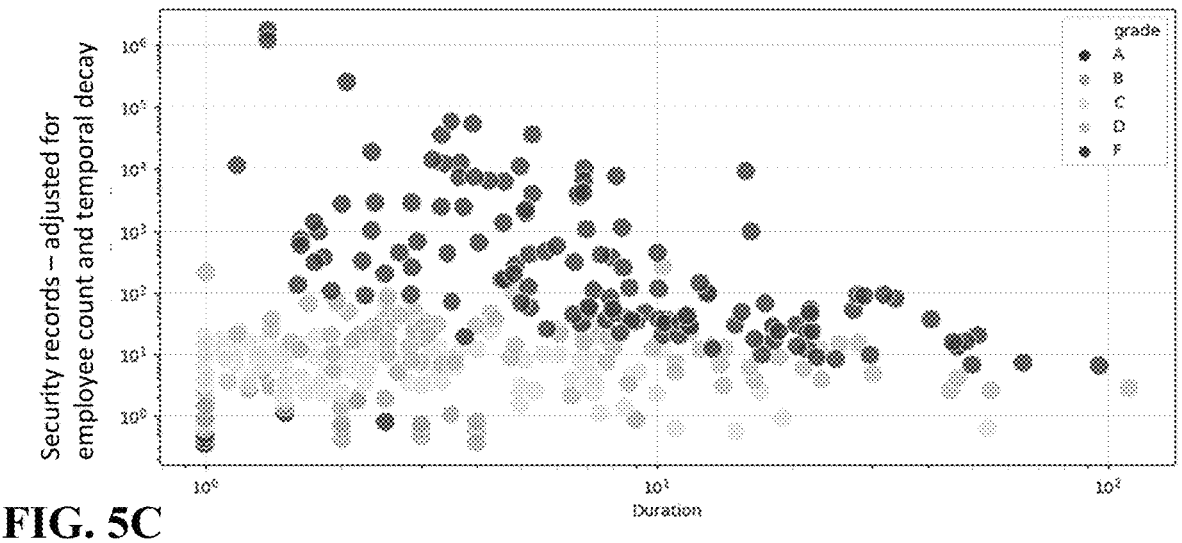

FIGS. 5A-5C illustrate the adjustment of the security record counts of a security risk type for a peer entity group. Note that the key of letter grades A, B, C, D, and F corresponds to percentiles into which peer entities fall. For example, peer entities that are in the $91^{st}$ to $100^{th}$ percentile of the peer group attain a letter grade A; peer entities that are in the $71^{st}$ to $90^{th}$ percentile of the peer group attain a letter grade B; peer entities that are in the $41^{st}$ to $70^{th}$ percentile of the peer group attain a letter grade C; peer entities that are in the $21^{st}$ to $40^{th}$ percentile of the peer group attain a letter grade D; peer entities that are in the $20^{th}$ and below percentile of the peer group attain a letter grade F. FIG. 5A is a plot of peer security records for the security risk type "Botnet Infections" in which no adjustment was made to the security records. FIG. 5B is a plot of peer security records of FIG. 5A in which the security records are adjusted for employee count. As compared to the unadjusted records in FIG. 5A, the adjustment in FIG. 5B can cause a wider redistribution of the security records among the letter grades. FIG. 5C is a plot of peer security records of FIG. 5A in which the security records are adjusted for employee count and for temporal decay. The redistribution of the records in FIG. 5C can be more pronounced due to the additional adjustment.

In step 410, the method can include comparing, for one or more security risk types, the received number of security records for the particular entity to the respective adjusted number of security records for each peer entity. Additionally or alternatively, the method may include comparing the number of entity IP addresses based on the adjusted number of IP addresses for each peer entity.

In some embodiments, the method can include determining an impact of each security risk type on the security profile of a particular entity. In some embodiments, the method can include determining a temporal decay for the security risk type, as described above. The method can further include adjusting the impact of the security risk type based on the temporal decay.

In some embodiments, the method can include determining a rank of each security risk type for improving the security profile (e.g., security rating) of the particular entity. The impact and/or ranking of the security risk types may be presented, as described above and illustrated in FIG. 3.

In step 412, the method can include comparing a security profile of the particular entity to security profiles of the population of peer entities based on the comparison for respective security risk types.

In step 414, the method can include presenting the comparison of the security profiles in a user interface, as described above.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 6:
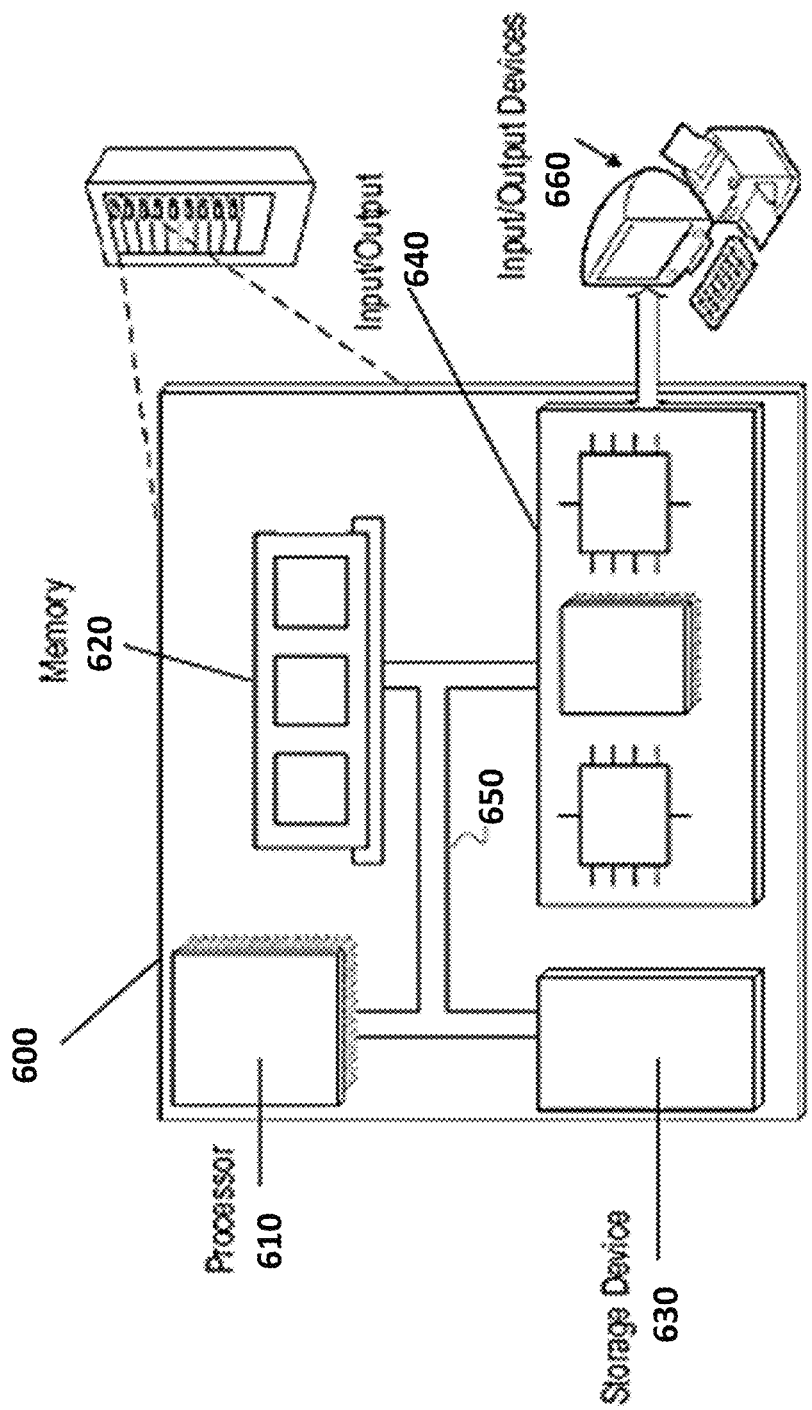
FIG. 6 is a block diagram of an exemplary computer system that may be used in implementing the systems and methods described herein.

FIG. 6 is a block diagram of an example computer system 600 that may be used in implementing the technology described in this document. General-purpose computers, network appliances, mobile devices, or other electronic systems may also include at least portions of the system 600. The system 600 includes a processor 610, a memory 620, a storage device 630, and an input/output device 640. Each of the components 610, 620, 630, and 640 may be interconnected, for example, using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630.

The memory 620 stores information within the system 600. In some implementations, the memory 620 is a non-transitory computer-readable medium. In some implementations, the memory 620 is a volatile memory unit. In some implementations, the memory 620 is a nonvolatile memory unit.

The storage device 630 is capable of providing mass storage for the system 600. In some implementations, the storage device 630 is a non-transitory computer-readable medium. In various different implementations, the storage device 630 may include, for example, a hard disk device, an optical disk device, a solid-date drive, a flash drive, or some other large capacity storage device. For example, the storage device may store long-term data (e.g., database data, file system data, etc.). The input/output device 640 provides input/output operations for the system 600. In some implementations, the input/output device 640 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 660. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 630 may be implemented in a distributed way over a network, such as a server farm or a set of widely distributed servers, or may be implemented in a single computing device.

Although an example processing system has been described in FIG. 6, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A computer-implemented method comprising:
receiving, for a particular entity, (i) a value for at least one feature of the entity and (ii) a number of security records for the entity, each security record being of a security risk type;
determining a population of peer entities based on the value of the at least one feature;
obtaining, for each peer entity, a number of security records;
adjusting the number of peer security records based on the number of entity security records;
comparing, for at least one security risk type, the received number of security records for the particular entity to the respective adjusted number of security records for each peer entity;
comparing a security profile of the particular entity to security profiles of the population of peer entities based on the comparison for the at least one security risk type; and
presenting the comparison of the security profiles in a user interface.

2. The method of claim 1, further comprising:
determining an impact of each security risk type on an entity security profile; and
presenting at least one security risk type based on the determined impact.

3. The method of claim 2, wherein presenting the at least one security risk type based on the determined impact comprises:
determining a rank of each security risk type for improving the entity security profile; and
presenting a ranking of at least two security risk types based on the determined rank of each security risk type.

4. The method of claim 2, wherein determining the impact of each security risk type on the entity security profile comprises:
determining a temporal decay for the security risk type; and
adjusting the impact of the security risk type based on the temporal decay.

5. The method of claim 1, wherein determining the population of peer entities based on the value of the at least one feature comprises:
determining the population of peer entities based on a value of a weighted combination of at least two features.

6. The method of claim 1, wherein the at least one feature comprises:
an industry of an entity;
a security rating of an entity;
a software platform utilized by an entity;
a geographical location of an entity; or
a size of an entity.

7. The method of claim 6, wherein the industry of an entity comprises at least one of: an industry name or a sector name.

8. The method of claim 6, wherein the geographical location of an entity is based on at least one of: a physical location or an Internet Protocol (IP) address.

9. The method of claim 6, wherein the software platform utilized by an entity is for least one of: a server system of the entity, a user base of the entity, or a web site of the entity.

10. The method of claim 6, wherein the size of an entity is based on at least one of: a number of employees of the entity or a number of services provided by the entity.

11. The method of claim 1, wherein the population of peer entities comprises at least 100 peer entities.

12. A system comprising:
one or more computer systems programmed to perform operations comprising:
receiving, for a particular entity, (i) a value for at least one feature of the entity and (ii) a number of security records for the entity, each security record being of a security risk type;
determining a population of peer entities based on the value of the at least one feature;
obtaining, for each peer entity, a number of security records;
adjusting the number of peer security records based on the number of entity security records;
comparing, for at least one security risk type, the received number of security records for the particular entity to the respective adjusted number of security records for each peer entity;

comparing a security profile of the particular entity to security profiles of the population of peer entities based on the comparison for the at least one security risk type; and presenting the comparison of the security profiles in a user interface.

13. The system of claim 12, wherein the operations further comprise:

determining an impact of each security risk type on an entity security profile; and presenting at least one security risk type based on the determined impact.

14. The system of claim 13, wherein presenting the at least one security risk type based on the determined impact comprises:

determining a rank of each security risk type for improving the entity security profile; and presenting a ranking of at least two security risk types based on the determined rank of each security risk type.

15. The system of claim 13, wherein determining the impact of each security risk type on the entity security profile comprises:

determining a temporal decay for the security risk type; and adjusting the impact of the security risk type based on the temporal decay.

16. The system of claim 12, wherein determining the population of peer entities based on the value of the at least one feature comprises:

determining the population of peer entities based on a value of a weighted combination of at least two features.

17. The system of claim 12, wherein the at least one feature comprises:

an industry of an entity;

a security rating of an entity;

a software platform utilized by an entity;

a geographical location of an entity; or a size of an entity.

18. The system of claim 17, wherein the industry of an entity comprises at least one of: an industry name or a sector name.

19. The system of claim 17, wherein the geographical location of an entity is based on at least one of: a physical location or an Internet Protocol (IP) address.

20. The system of claim 17, wherein the software platform utilized by an entity is for least one of: a server system of the entity, a user base of the entity, or a web site of the entity.

21. The system of claim 17, wherein the size of an entity is based on at least one of: a number of employees of the entity or a number of services provided by the entity.

22. The system of claim 12, wherein the population of peer entities comprises at least 100 peer entities.

* * * * *